United States Patent [19]
Rempel

[11] 3,878,957

[45] Apr. 22, 1975

[54] FRUIT HARVESTING MACHINE

[75] Inventor: Dietrich G. Rempel, Akron, Ohio

[73] Assignee: Rempel Enterprises Inc., Akron, Ohio

[22] Filed: June 16, 1972

[21] Appl. No.: 263,706

[52] U.S. Cl. ............ 214/508; 214/83.1; 214/83.28; 182/148
[51] Int. Cl. ........................ B60p 1/60; B60p 1/04
[58] Field of Search ................. 214/83.1, 83.28, 83; 56/328 R; 53/390; 302/58; 37/58; 182/16, 129, 148

[56] References Cited
UNITED STATES PATENTS

| | | | |
|---|---|---|---|
| 3,233,396 | 2/1966 | Gallo | 56/328 R |
| 3,413,787 | 3/1968 | Antwerp et al. | 56/328 R |
| 3,464,195 | 9/1969 | Crichfield | 56/328 R |
| 3,543,494 | 12/1970 | Bartrum | 56/328 R |
| 3,633,336 | 1/1972 | Rempel | 214/83.1 X |
| 3,666,120 | 5/1972 | Paine | 214/90 R |

*Primary Examiner*—Albert J. Makay
*Attorney, Agent, or Firm*—Hamilton, Renner & Kenner

[57] ABSTRACT

A fruit harvesting apparatus comprising an articulated extensible hollow boom rotatably mounted on the front section of a vehicle and carrying a man-supporting bucket at its outer end. Controls in the bucket for constantly changing its position by raising and lowering, extending and rectracting, and swinging the boom are foot actuated. A hopper is movably mounted on the rear section of the vehicle for selective dumping. Means carried by the bucket guide the fruit picked by a man therein into the outer end of the hollow boom, and a conduit connects the inner end of the boom to the hopper. Subatmospheric pressure is maintained within the hopper to generate air flow from the outer end of the boom through the boom into the hopper, whereby the picked fruit is conducted rapidly through the boom into the hopper. The front and rear sections of the vehicle are pivotally connected and variable power drive means are provided for steering one section with respect to the other section.

16 Claims, 35 Drawing Figures

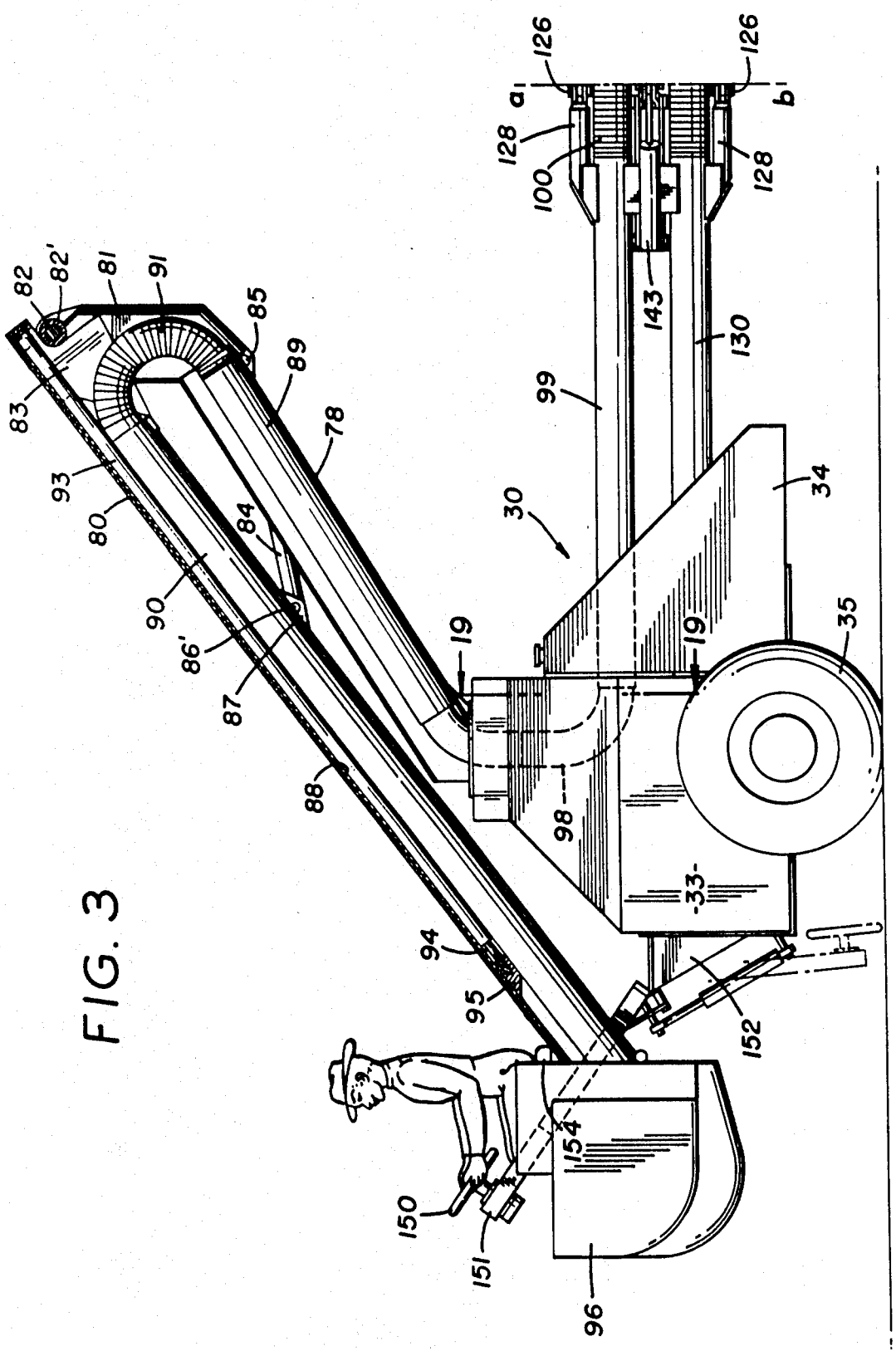

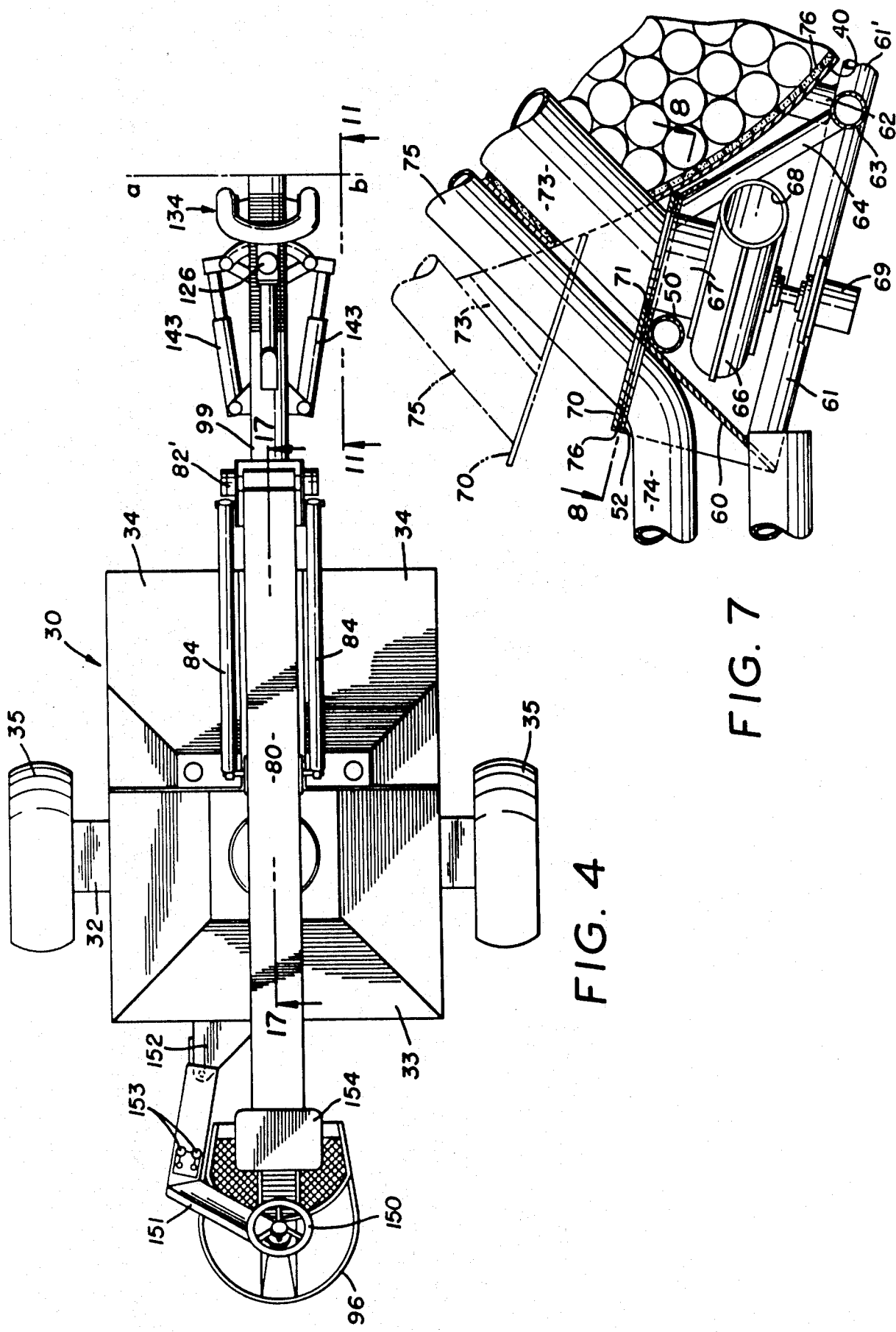

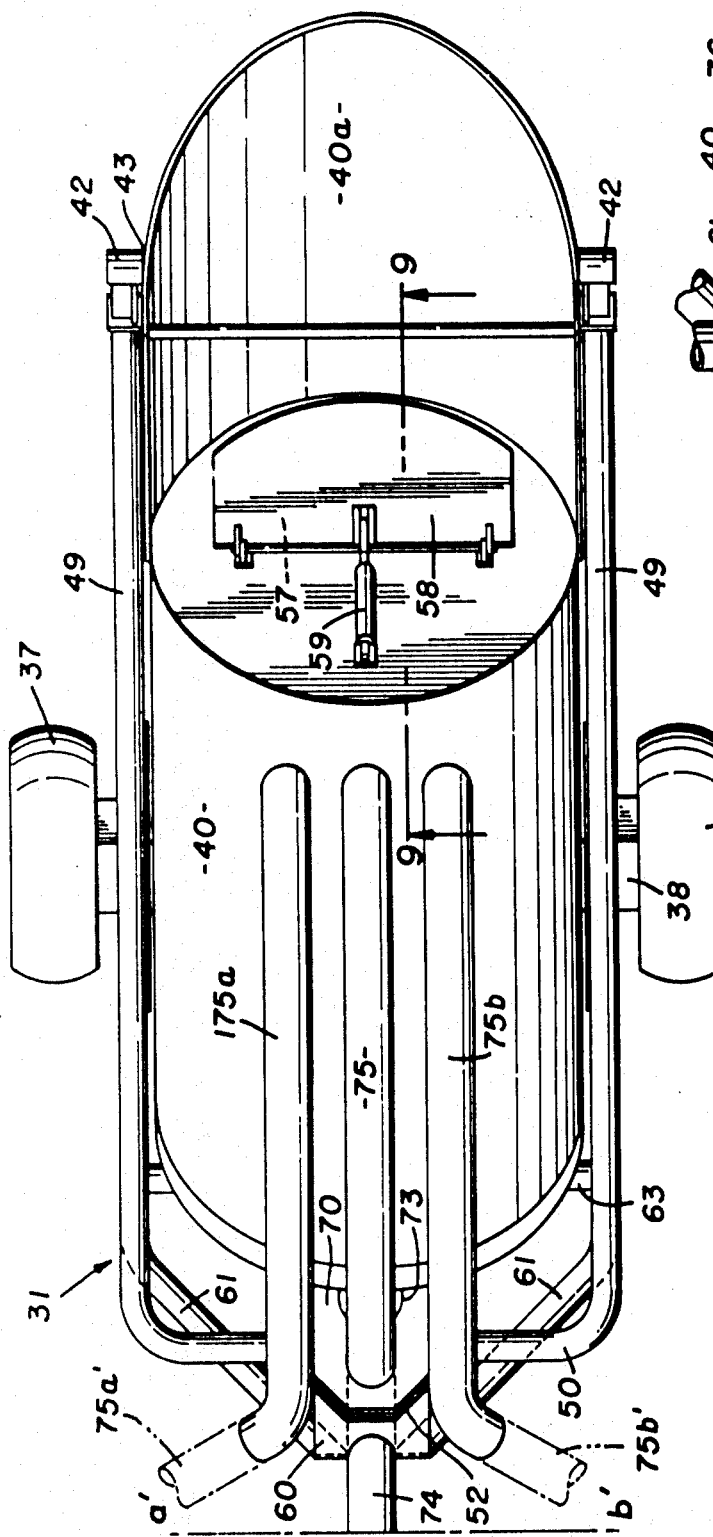
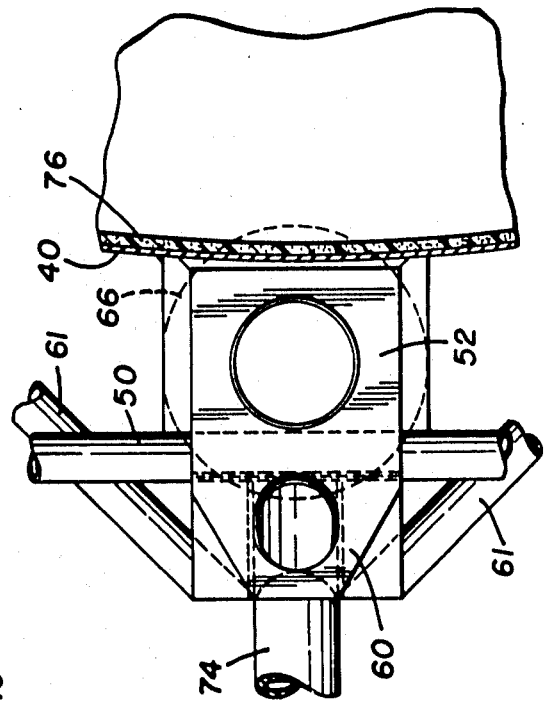
FIG. 4A
FIG. 8

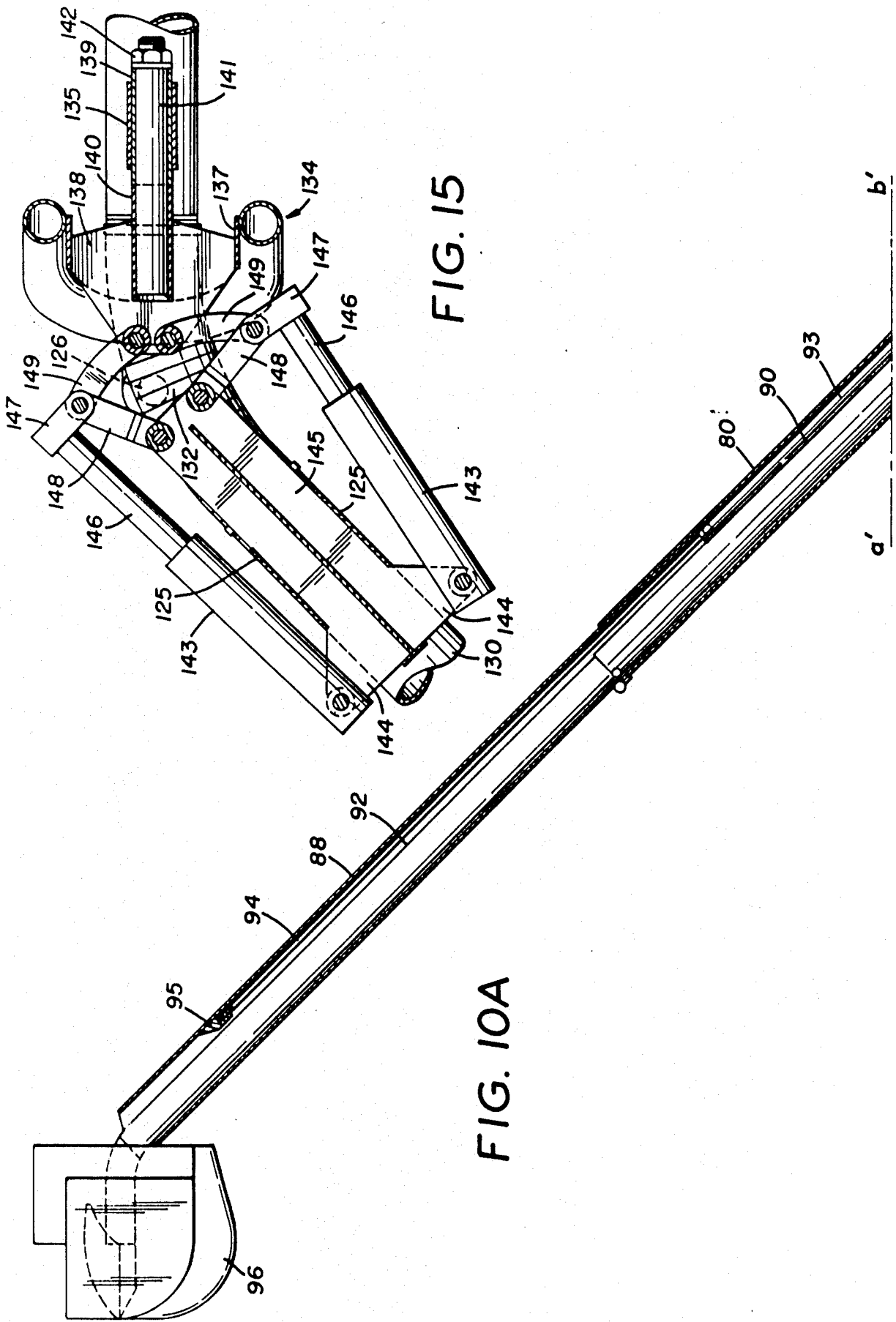

FRUIT HARVESTING MACHINE

BACKGROUND OF THE INVENTION

For many years the harvesting of various kinds of fruit from commercial orchards has been done by hand picking from ladders into sacks carried by the pickers. In recent years the scarcity of labor and greatly increased labor costs have given rise to a large variety of mechanical picking machines and systems, particularly in the citrus orchards supplying rapidly increasing demand for juice concentrate, and vast amounts of time and money have been expended in experimentation and development toward reducing picking costs.

Various mechanical devices for reaching into trees and picking fruit one or a few at a time have been tried, but those of which I am aware are much too slow and are difficult to manipulate to do a thorough job of picking. Other devices are designed to mechanically shake the trees to drop fruit onto collecting platforms or surfaces which deliver it to conveyors, but these have not been commercially successful for a number of reasons. The trees require vigorous shaking to dislodge the fruit, which damages the tree trunk, leaves and branches, as well as the tree root system, normally growing in sandy soil. With many varieties of fruit, blossoms, green fruit and ripe fruit grow side-by-side and some of the blossoms and green fruit are shaken off along with the ripe fruit, with consequent loss of future crop.

In recognition of the damage to the trees caused by the required vigorous shaking to drop the fruit, it has been attempted to spray the trees bearing the ripening fruit with a chemical compound formulated to cause the stems to be more easily detached, but this treatment has not been perfected and is believed to detract from the health and yield of the trees.

The safest picking procedure from the standpoint of damage to the fruit and to the trees is still hand picking, and this procedure is also the most thorough from the standpoint of selectively picking all the ripe fruit from the trees without substantial injury to the fruit and trees, regardless of the size and spacing of the trees and the amount of fruit thereon.

U.S. Pat. No. 2,450,152 discloses a fruit picker's crane designed to take the place of a ladder and save the time and effort of climbing up and down the ladder and constantly changing its position. This crane has an articulated boom mounted on a truck, the upper arm having a picker's seat at its outer end and the arm being hollow to allow the fruit to roll by gravity down through the upper arm into a hopper attached to the lower arm. However, the maneuverability of the picker's seat is limited by the fact that neither of the arms of the boom are per se extensible, the overall extensibility being limited to operating the arms as levers pivoted to each other, and, also, the picker's seat always faces in the same direction so that the picker can not turn around to pick fruit behind him. Furthermore, the conveyance of the fruit by gravity precludes picking fruit with the upper arm at or below horizontal as required from the low hanging branches prevalent in citrus trees. The result is that low hanging fruit can not be picked from the picker's seat and conveyed to the hopper, but must be separately picked and handled.

U.S. Pat. No. 2,131,672 discloses a fruit picking apparatus having a hopper which discharges into a box carried on a vehicle with means for creating a suction within the hopper. A collector pipe is pivoted on the hopper and is adapted to be swung upwardly into the tree. At the upper end of the collector pipe is an open mouth for receiving articles of fruit successively by breaking off the stems against the edge of the mouth opening. The pipe has an extensible section which is pulled out and clamped by hand.

This picking apparatus is obviously very slow as it requires an operator standing on a platform on the vehicle or on a ladder to manipulate the collector pipe in various directions so as to position the mouth accurately to receive an article of fruit and to change the position for each successive article picked. This is a tedious and laborious task and would not begin to be competitive with the high production picking required in commercial citrus groves. The higher the tree the more difficult the task becomes. Hand labor is also required to transfer the boxes from below the hopper to collecting trucks.

In my prior U.S. Pat. No. 3,633,336, improved fruit picking apparatus is disclosed having an articulated extensible hollow boom rotatable on a vehicle and carrying a man-supporting bucket at its outer end. A trough around the bucket rolls hand picked fruit into the boom wherein a co-extensible conveyor transports it through the boom onto a rearwardly moving extensible conveyor on the vehicle for discharge into successively positioned containers which when filled are deposited on the ground to be picked up by a collection truck.

Although this apparatus enables a man in the bucket to manipulate himself all over the tree while performing high production picking and transports fruit he deposits in the trough from all positions, including ground level, the apparatus is complicated and expensive to build and maintain because of the required extensible conveyors in the boom and on the vehicle and the mechanism for handling and depositing the filled containers on the ground. Further, special equipment is required for picking up the filled containers deposited on the ground, which adds greatly to the expense.

SUMMARY OF THE INVENTION

It is an object of the present invention to provide a simple and improved fruit harvesting machine which will overcome the disadvantages of prior machines and enable high production selective picking.

Another object is to provide an improved machine having a picker-supporting bucket carried at the outer end of an extensible rotatable boom manipulated by the picker to allow picking all the ripe fruit from all parts of the tree.

Another object is to provide an improved machine having novel air flow means for conducting fruit from the picker bucket through the extensible boom to a hopper on the vehicle supporting the boom.

A further object is to provide an improved hopper or the supporting vehicle adapted for bodily dumping fruit into a collecting vehicle.

Another object is to provide novel trough means or the bucket for receiving fruit and conducting it into the boom.

Another object is to provide improved foot operated controls within the picker-supporting bucket for manipulating the boom and bucket in all directions.

A further object is to provide improved means for extensibly mounting power lines within the extensible boom and connected to the controls in the bucket.

A still further object is to provide an improved articulated vehicle comprising front and rear sections connected by a central pivot, the boom being rotatably mounted on the front section and the hopper being tiltably mounted on the rear section for bodily dumping.

Still another object is to provide improved variable power drive means for pivoting one section relative to the other to steer the vehicle.

These and other objects are accomplished by the improved apparatus, parts and arrangements comprising the present invention, a preferred embodiment of which is shown and described herein by way of example. Various modifications and changes in details of construction are comprehended within the scope of the appended claims.

DESCRIPTION OF THE DRAWINGS

FIGS. 3 and 3A taken together represent an enlarged side elevation of the machine with the boom in lowered and retracted position.

FIGS. 4 and 4A taken together represent an enlarged plan elevation of the machine with the boom in lowered and retracted position.

FIG. 7 is an enlarged partial section at the lower part of the hopper showing the fan and connected suction conduit and the connected fruit conduits going to the hopper.

FIG. 8 is a partial sectional view on line 8—8 of FIG. 7.

FIGS. 10 and 10A taken together represent an enlarged partial side elevation of the front vehicle section showing the boom raised and in fully extended position.

FIG. 15 is a partial plan section as on line 15—15 of FIG. 11, showing the steering mechanism in an intermediate position.

DESCRIPTION OF THE PREFERRED EMBODIMENT

Figure 1:
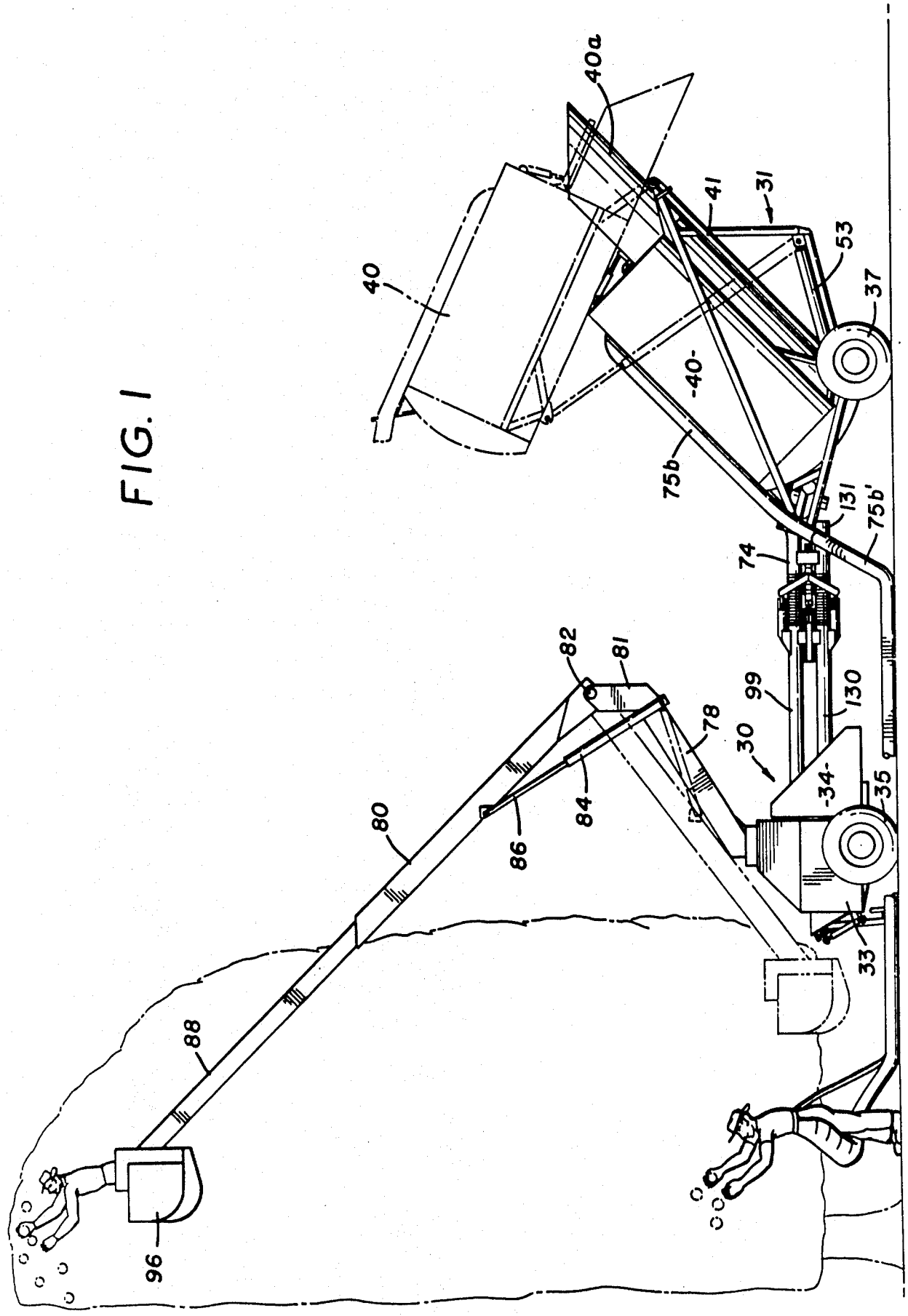
FIG. 1 is a side elevation of the improved fruit harvesting machine in operation with the boom extended, the boom being shown in phantom lines in lowered and retracted position and the hopper being shown in phantom lines in dumping position.

Referring first to FIGS. 1 - 4A, the improved fruit harvesting machine has a supporting vehicle comprising a front section indicated generally at 30 and a rear section indicated generally at 31. The front section 30 has an axle 32 which carries a housing 33 enclosing a suitable internal combustion engine and hydraulic pumps driven by the engine (not shown). Tanks 34 for gasoline and hydraulic fluid are carried at the rear of the housing. The housing and fuel tanks are supported on a pair of wheels 35, and each wheel is individually driven by its own axially mounted variable speed fluid torque motor of well-known construction. One of the hydraulic pumps supplies hydraulic fluid under pressure to the torque motors for driving the wheels 35.

The rear vehicle section 31 has an axle 36 supported on a pair of wheels 37, each of which is individually driven by its own axially mounted variable speed fluid torque motor and the wheels 37 are supplied with hydraulic fluid by the same pump in the housing 32 that supplies the front wheels 34. The wheels 37 support an axle channel beam 38 on which a frame is mounted for supporting a hopper 40 in rearwardly inclined position. The frame includes rearwardly inclined bars 41 straddling the underside of the hopper connected at their lower ends to axle 38 and having pivots 42 at their upper ends on a cross bar 43. Bars 44 parallel to the bars 41 also extend along the underside of the hopper and are welded to the hopper. These bars 44 are connected at their lower ends to a cross angle 45 by angular brace bars 46 and 47 and at their upper ends to the cross bar 43 by angular bars 48. The cross angle 45 fits over and rests on the axle channel when the hopper is in lowered position.

The frame also includes angular bars 49 connected at their upper ends to the pivots 42 and extending angularly downward on opposite sides of the hopper. The lower ends of bars 49 are connected by a cross bar 50 extending under the front lower end of the hopper 40. The cross bar 50 is welded to the underside of a joint plate 52 where the fruit conduit leading to the hopper is separated when the hopper is swung upwardly for dumping.

A telescopic two-stage hydraulic cylinder 53 is pivotally connected at its inner end to the cross angle 45. The outer end of cylinder 53 is pivotally connected to an abutment plate 54 supported on an X frame including diverging lower bars 55 extending from plate 54 and welded at their opposite ends to the axle channel beam 38. The X frame also includes diverging upper bars 56 extending from the plate 54 and welded at their upper ends to the bars 41 and the downwardly inclined bars 49. The extended position of the cylinder 53 with the hopper in dumping position is shown in phantom lines in FIG. 3A. A dumping chute 40a extends from the top rear side of the hopper to discharge fruit falling through an opening 57 normally closed by a trap door 58 hinged on the top wall of the hopper and operated by a hydraulic cylinder 59 operatively connected to the door.

Figure 3A:
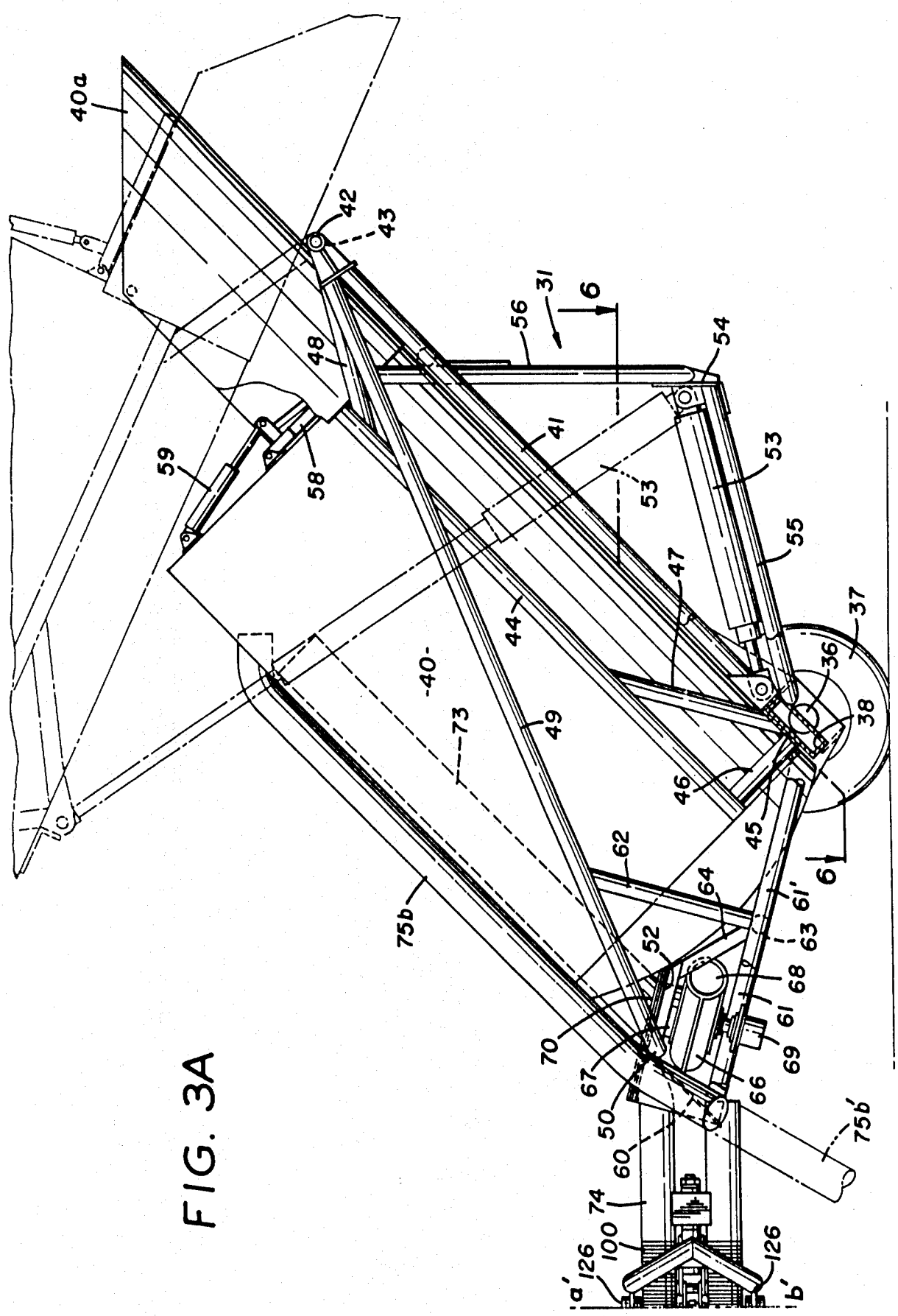
Figure 6:
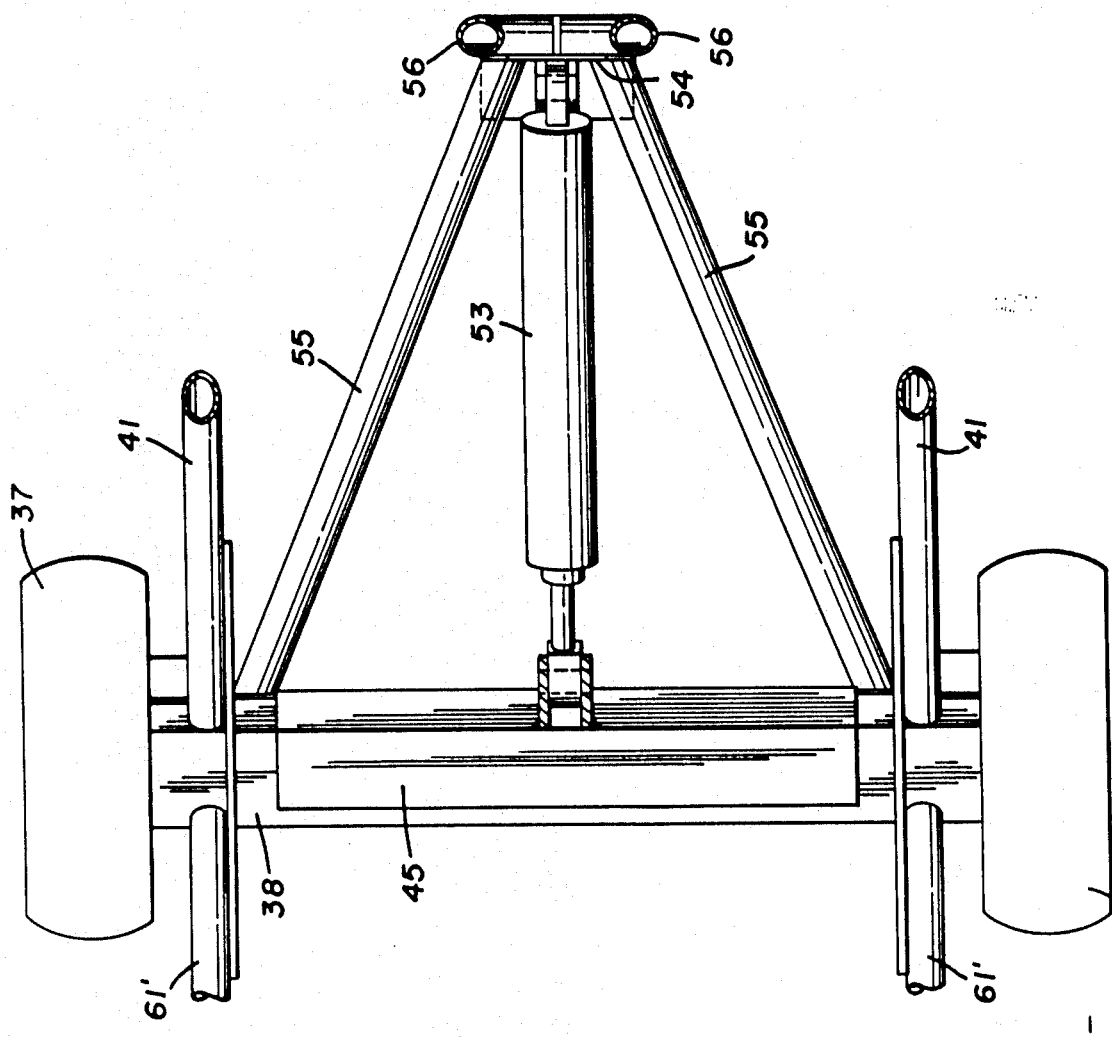
FIG. 6 is a sectional view as on line 6—6 of FIG. 3A.

As best shown in FIGS. 3A, 7 and 8, a downwardly extending bracket plate 60 is welded at its upper edge to the cross bar 50 under the joint plate 52 and is welded at its lower edge to the ends of diverging bottom bars 61 which bend into rearwardly extending portions 61' welded at their rear ends to axle channel 38. Brace bars 62 connect the portions 61' to the side bars 49, and a cross bar 63 connects portions 61' adjacent the lower ends of brace bars 62. A brace bar 64 extends between cross bar 63 and the rear edge of the joint plate 52.

Figure 9:
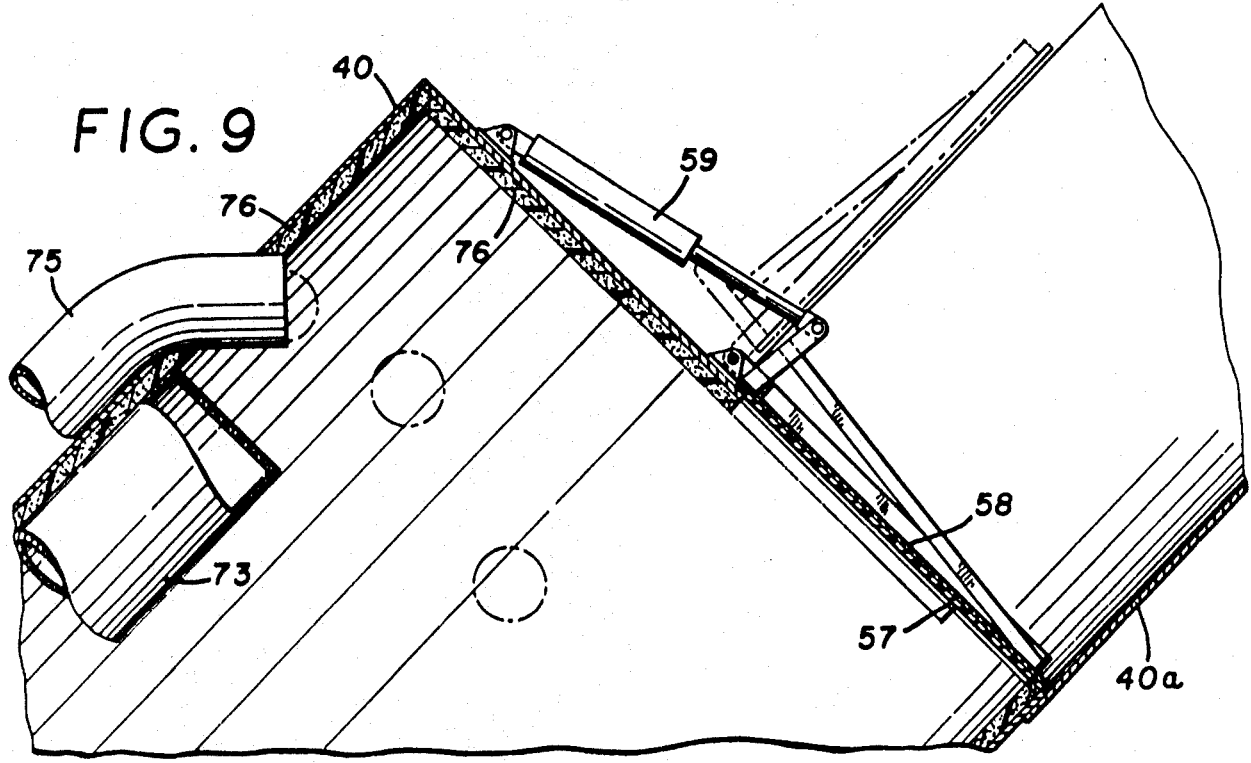
FIG. 9 is a partial sectional view of the top of the hopper on line 9—9 of FIG. 4A.

A spiral blower fan 66 for maintaining subatmospheric pressure in the hopper 40 is mounted below the joint plate 52 with its suction duct 67 extending into and tightly fitting an opening in the joint plate. The cross bar 50 is welded to the duct 67 and the brace bar 64 is welded to the fan housing which has an exhaust duct 68. The fan is driven by a hydraulic motor 69. A matching upper joint plate 70 having an opening 71 registering with the suction duct 67 is mounted on the lower end of a suction duct 73 for abutting the joint plate 52 when the hopper is in lowered position. The suction duct 73 extends into the hopper 40 along its upper side, terminating near the upper end (FIG. 9).

Figure 5:
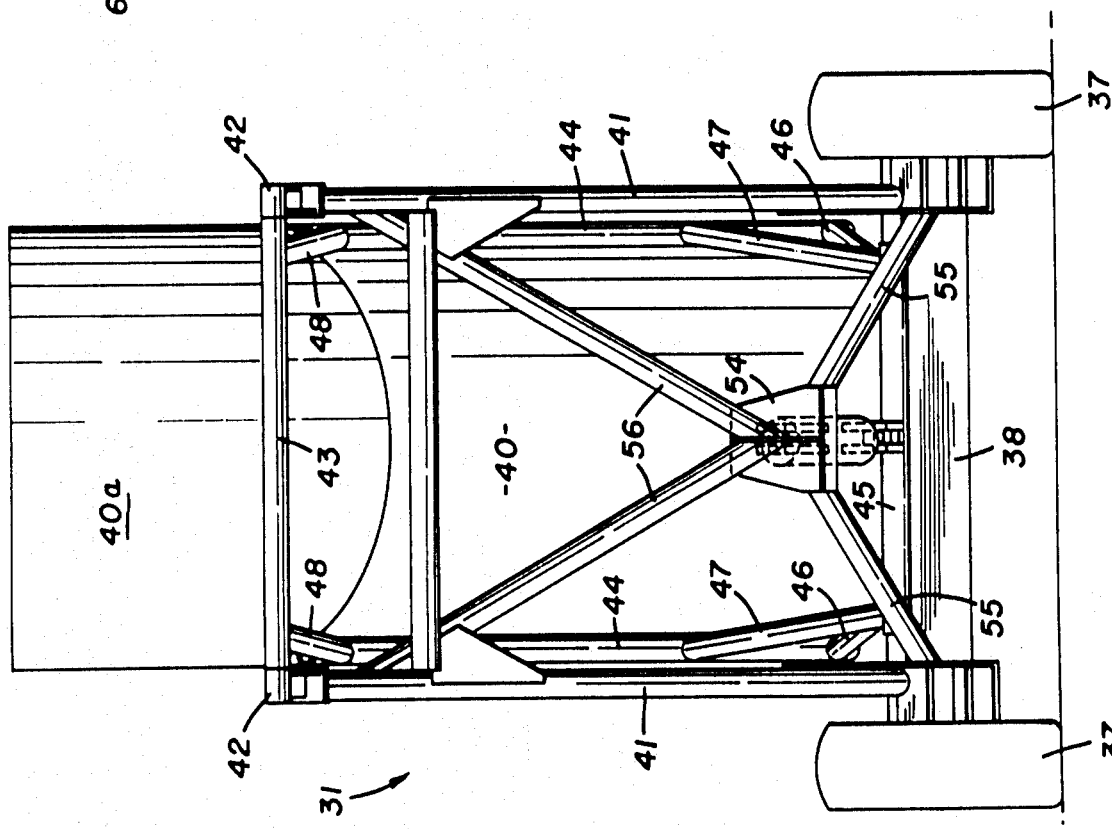
FIG. 5 is a rear elevation of the rear section of the vehicle.
Figure 30:
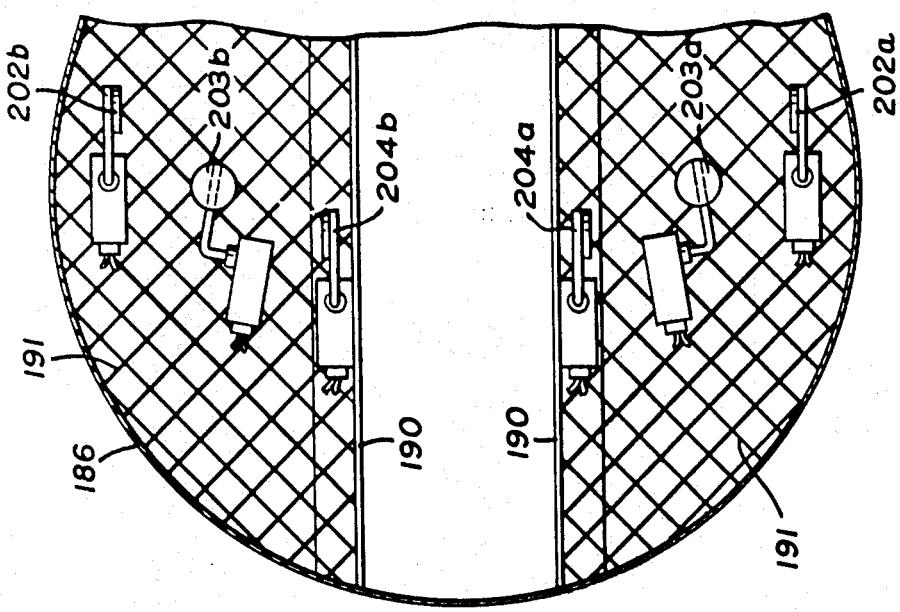
FIG. 30 is a plan sectional view on line 30—30 of FIG. 27.
Figure 10:
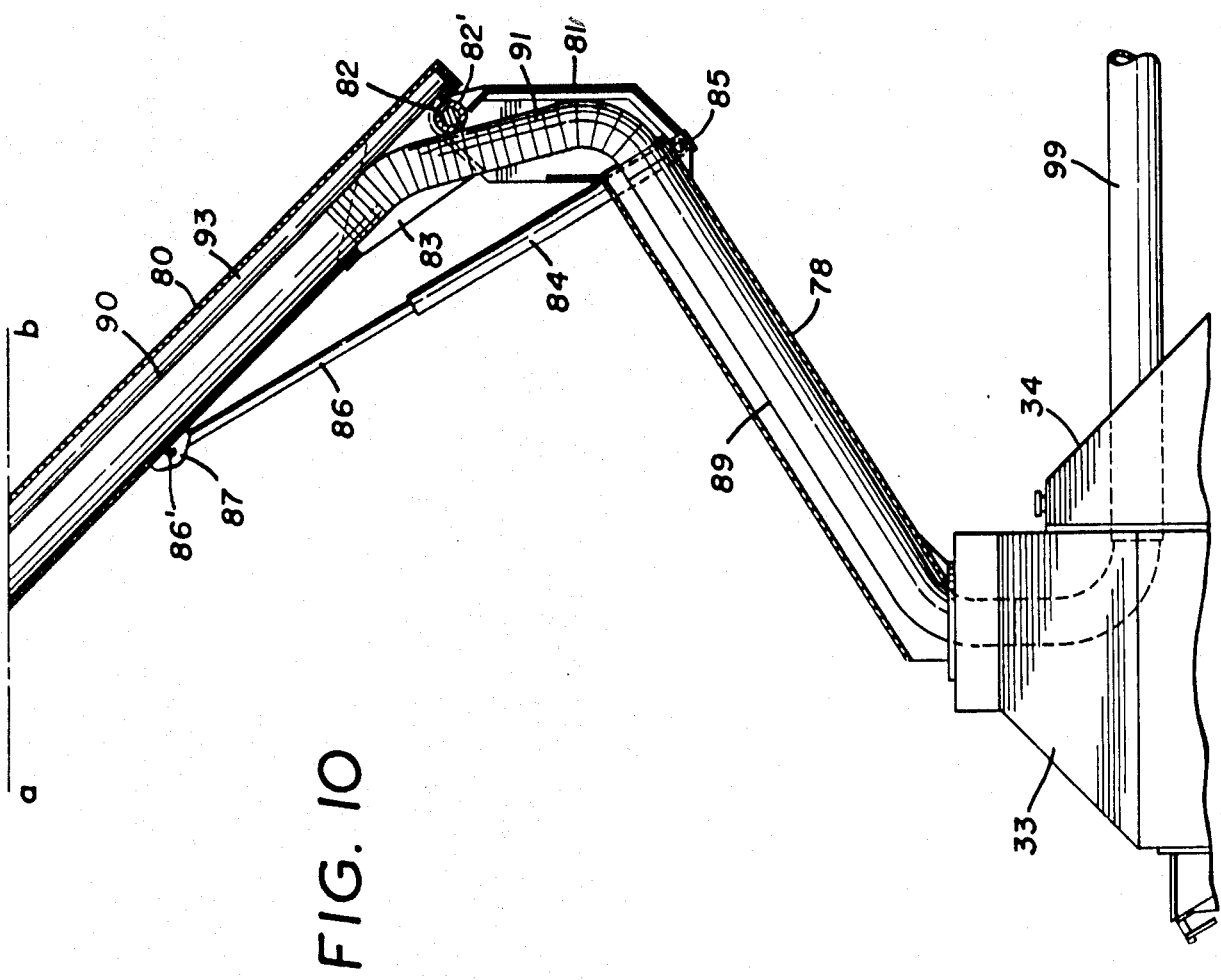
Figure 11:
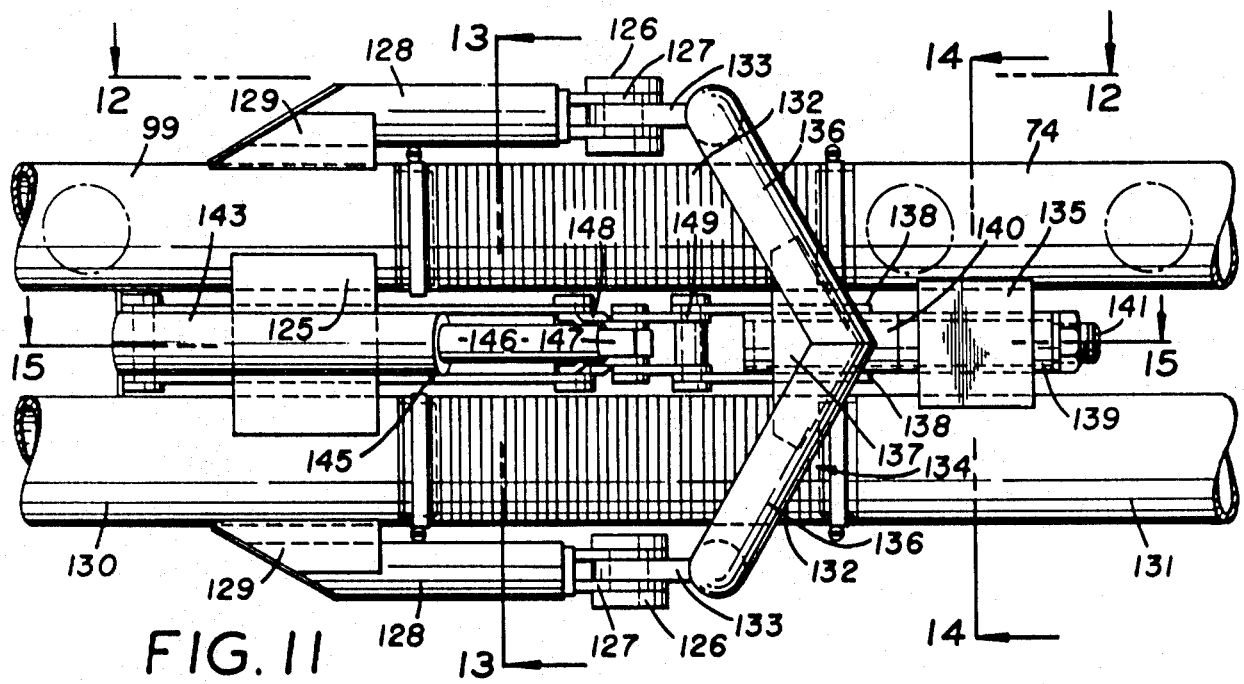
FIG. 11 is an enlarged partial side elevation on line 11—11 of FIG. 4, showing the pivotal steering mechanism.
Figure 12:
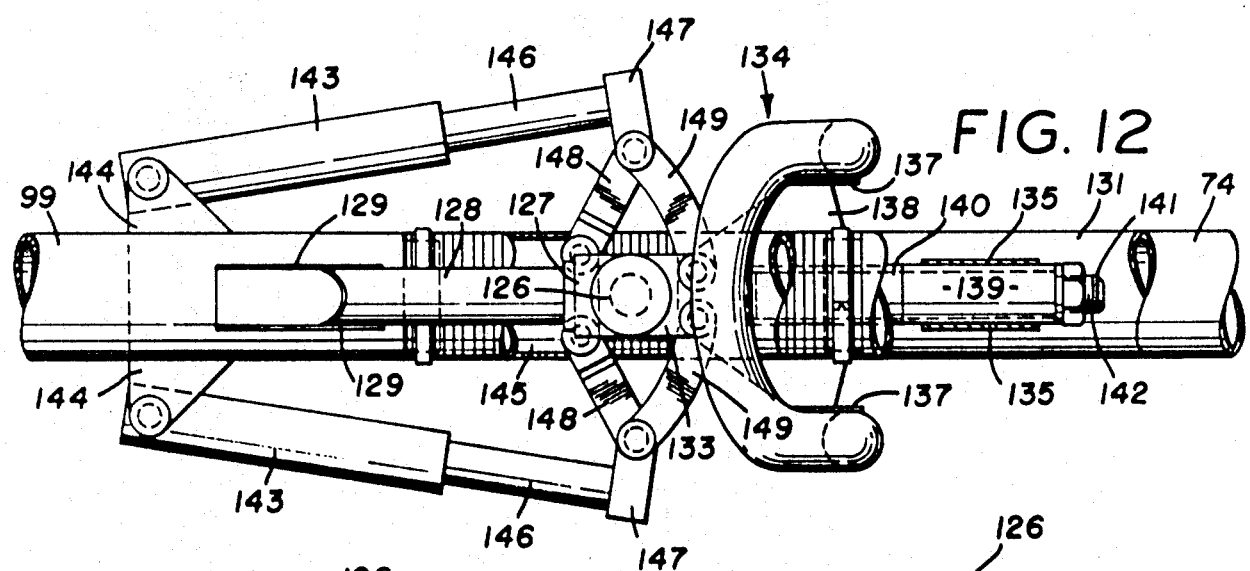
FIG. 12 is a plan view on line 12—12 of FIG. 11.
Figure 13:
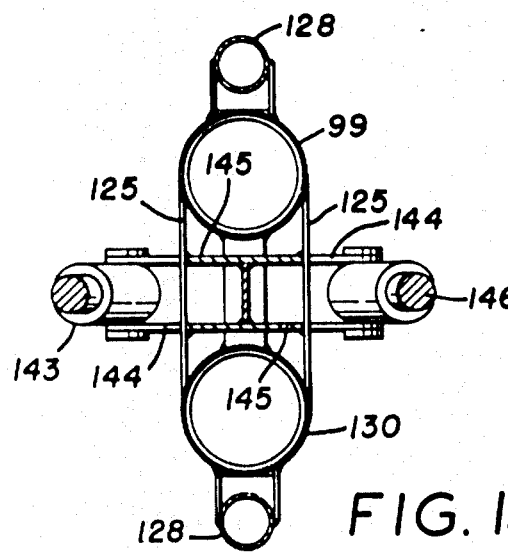
FIG. 13 is a partial section on line 13—13 of FIG. 11.
Figure 14:
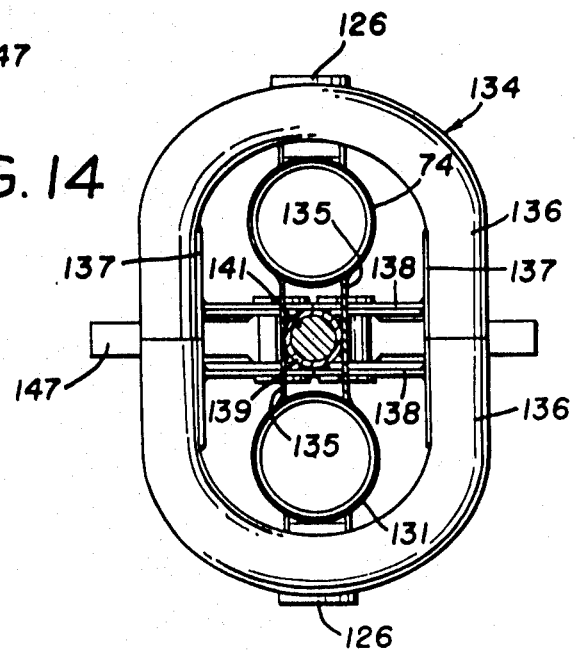
FIG. 14 is a partial section on line 14—14 of FIG. 11.

Matching openings are also provided in the joint plates 52 and 70 for receiving the adjoining ends of fruit conduits 74 and 75. Sponge rubber gasket material 76 is provided between the plates to seal around the openings for the fruit conduits and the suction ducts when the hopper is in lowered position. As indicated in the phantom lines in FIGS. 3A and 5, when the hopper is raised for dumping by the cylinder 53, the upper joint plate 70 separates from lower joint plate 52, carrying with it fruit conduit 75 and suction duct 73. At its upper end fruit conduit 75 bends inward through the wall of hopper 40 near the upper end of suction duct 73 so that fruit is discharged into the upper part of the hopper, as shown in FIG. 9. The hopper is lined throughout with sponge material 76 to cushion the impact of the fruit discharged from conduit 75.

Referring to FIGS. 1, 3, 17 and 18, the lower tubular arm 78 of the boom is rotatably mounted at a fixed inclination by a bearing 79 in the top of the housing 33. As best shown in FIGS. 10 and 10A, 17A and 20, the upper tubular arm 80 of the boom is hinged at its inner end to the upper vertical end section 81 of lower arm 78 by a swivel shaft 82. The shaft 82 is swiveled in a sleeve 82' mounted in side wings 83 on the upper arm, which swing into the end section 81 when the upper arm is folded down alongside the lower arm 78, as shown in FIG. 3, for transporting the vehicle from place to place. The mechanism for raising and lowering the upper arm 80 preferably comprises a pair of hydraulic cylinders 84 on opposite sides of the boom, having their ends pivoted at 85 on the upper end of the lower arm and their piston rods 86 pivoted by a shaft 86' to brackets 87 on an intermediate portion of the upper arm 80.

The arms 78 and 80 are preferably rectangular in cross section, and a hollow rectangular arm 88 of smaller dimensions is telescopically and extensibly mounted within arm 80. Within the arm 78 is a cylindrical fruit conduit 89 secured to a shoe 89' in the upper end of the arm and a shoe 89'' in its lower end. Within the arm 80 is a cylindrical fruit conduit 90 secured to a shoe 90' in the lower end of the arm. The conduits 89 and 90 are connected by a flexible conduit section 91 which allows raising and lowering of the upper arm 80. A fruit conduit 92 of smaller diameter is slidably telescoped within the conduit 90 for extension and retraction with the extension and retraction of the arm 88. The extension and retraction of the arm 88 of the boom is accomplished by a hydraulic cylinder 93 mounted within and secured to the inner end of the upper arm 80 and having its piston rod 94 connected to a bracket 95 in the outer end portion of arm 88. The construction and operation of the boom arms 80 and 88 and the conduits 90 and 92 therein will be described in detail hereinafter.

The picker-supporting bucket 96 is pivotally mounted on the outer end of the arm 88 of the boom and is adapted to support a man standing therein so that he can reach out in all directions to pick fruit. Leveling means, hereinafter described are provided automatically to maintain the bucket level regardless of the positions of the boom arms. Controls (later described) operated by the feet of the picker standing in the bucket allow him to maneuver the bucket all over at least one side of a tree while having his hands free for picking.

By positioning the front vehicle section 30 centrally of four trees, the picker can manipulate the bucket 96 by rotating the lower arm 78 of the boom, raising and lowering the arm 80, and extending and retracting the arm 88, so as to completely pick all of the fruit from at least the adjacent inner spherical halves of the four trees. The picked fruit is deposited by the picker at the mouth of a flexible conduit section 97 connected to the outer end of conduit 92, and the air flow generated by the sub-atmospheric pressure in the hopper rapidly conducts the fruit through conduits 92, 90, 91 and 89 through the bearing 79, conduit elbow section 98, horizontal conduit 99, flexible section 100, and conduits 74 and 75 on the rear vehicle section, into the hopper 40. Thus, the upper arm 80 can be in lowered position, to enable the picker to reach low hanging branches, without interfering with the flow of fruit to the hopper.

Figure 17:
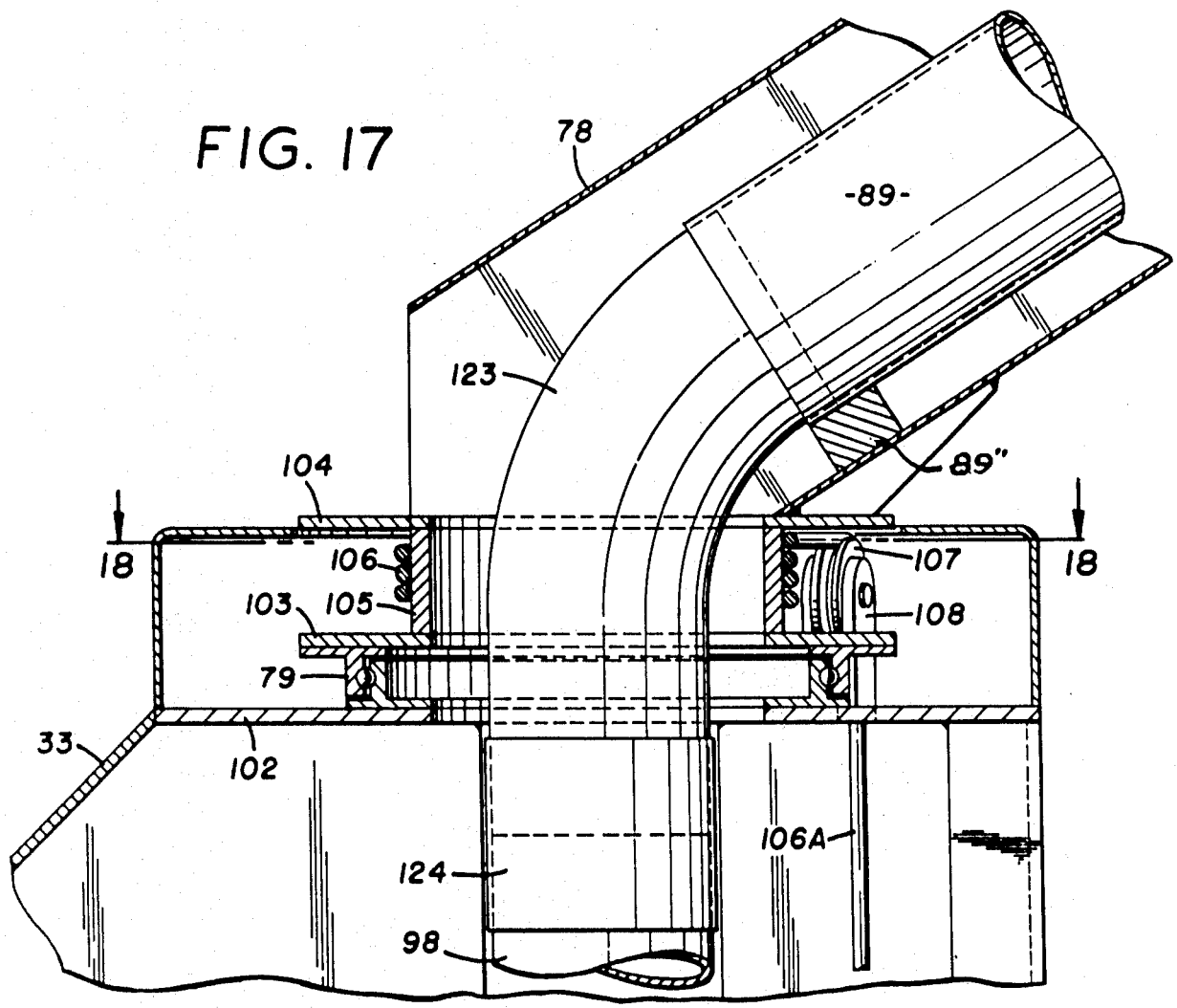
FIG. 17 is an enlarged partial vertical section of the lower end of the lower arm of the boom, showing its rotatable mounting on the front vehicle section.
Figure 18:
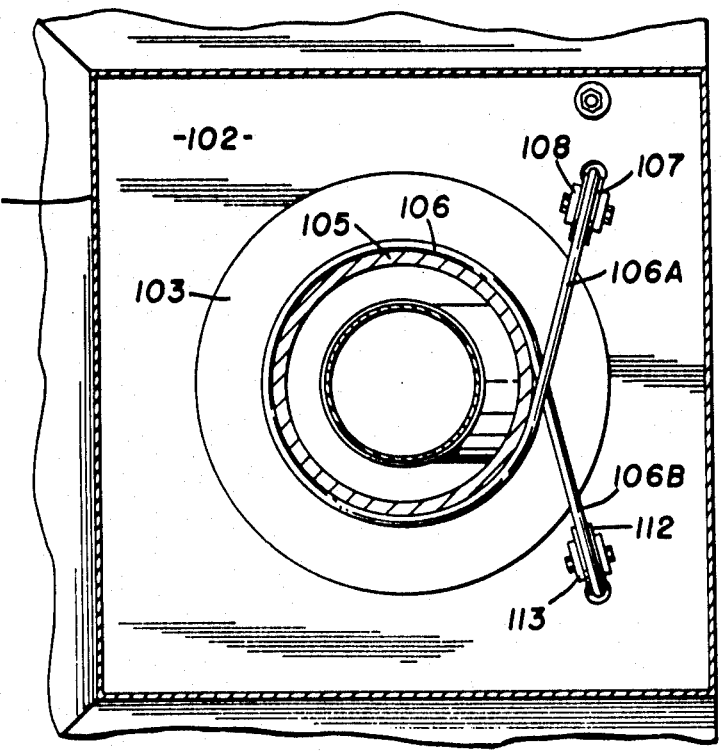
FIG. 18 is a plan sectional view on line 18—18 of FIG. 17.
Figure 19:
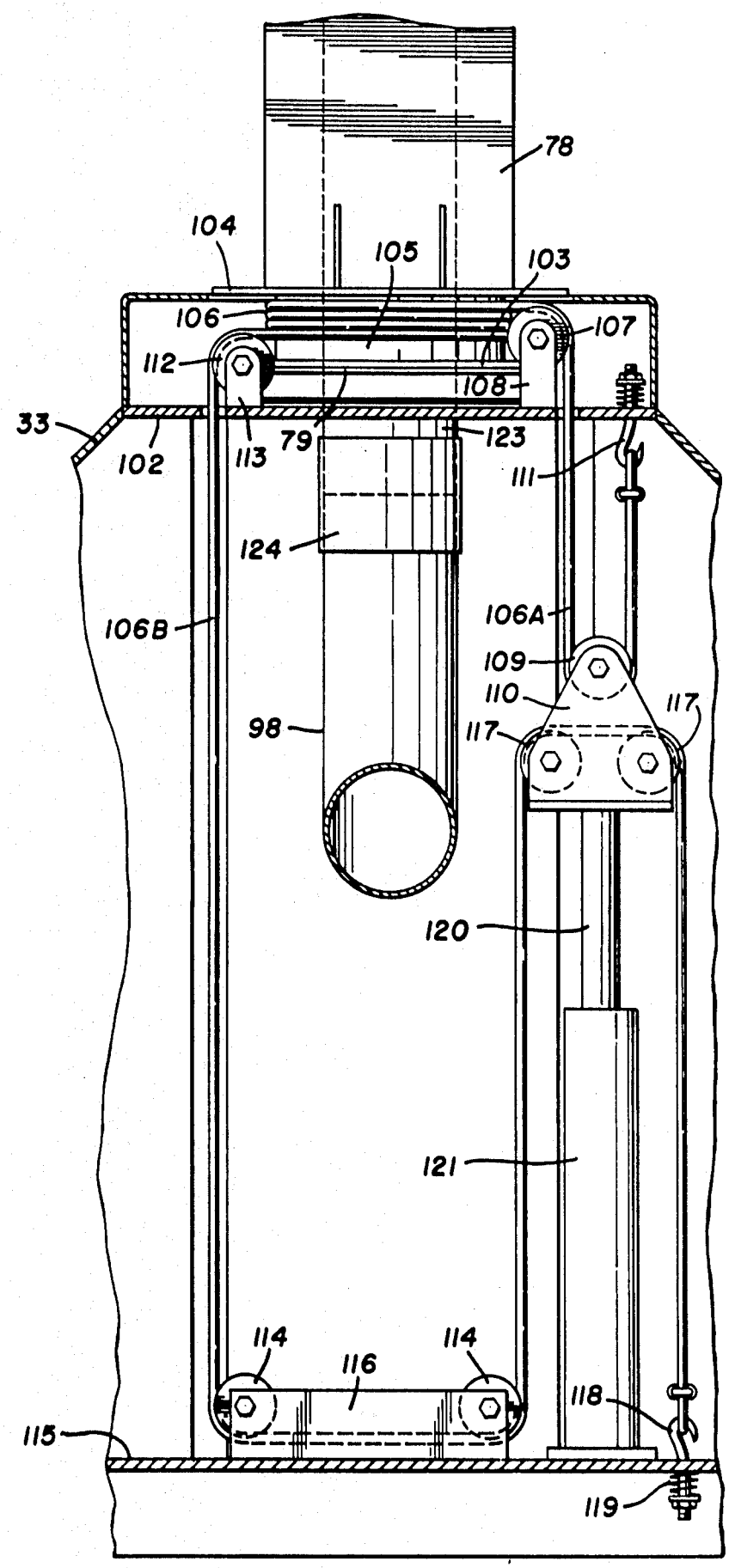
FIG. 19 is an enlarged vertical sectional view on line 19—19 of FIG. 3.

Referring to FIGS. 17 – 19, the mechanism for rotating the lower arm 78 includes a horizontal plate 102 in the upper part of housing 33 on which the anti-friction annular bearing 79 is supported. A lower annular flange 103 is secured to the top of the outer bearing race, and an upper annular flange 104 secured to the bottom of arm 78 is spaced from the lower flange 103 by a cylindrical sleeve 105, the sleeve and the flange 103 and 104 forming a reel around which a cable 106 is coiled.

One end portion 106A of the coiled cable is trained over a small pulley 107 supported on plate 102 by a bracket 108 and extends downwardly from pulley 107 under a pulley 109 on a carriage 110 and then upwardly to be fastened to a hook 111 yieldingly supported on plate 102. The other end portion 106B is trained over a small pulley 112 supported on plate 102 by a bracket 113 and extends downwardly under two pulleys 114 supported on the bottom of plate 115 of the housing by a bracket plate 116, then upwardly over two pulleys 117 on the carriage 110, and then downwardly to be fastened to a hook 118 yieldingly supported on the bottom plate 115 of the housing by a spring 119. The carriage 110 is supported on the piston rod 120 of a double-acting hydraulic cylinder 121 supported on bottom plate 115.

By selectively operating the piston rod 121 in either direction the arm 78 of the boom together with the conduit 89 secured therein is rotated in the desired direction without requiring expensive gearing which must be maintained lubricated. The conduit 89 is joined at its lower end to an elbow 123 extending through bearing 79 and is coupled to 90° elbow 98 by a coupling sleeve 124. The elbow 98 is joined to horizontal conduit 99.

The mechanism for steering the front and rear vehicle sections 30 and 31, relative to each other, is best shown in FIGS. 3 and 3A, and 11 – 16. Midway of the front wheels 35 and the rear wheels 37 are vertically aligned pivots 126 about which the front and rear vehicle sections swing when turning relative to each other. The upper pivot 126 is connected by a clevis 127 to a supporting bar 128 carried by bracket plates 129 welded to the top of the end of fruit conduit 99. Similarly, the lower pivot 126 is connected by a clevis 127 to a supporting bar carried by bracket plates 129 welded to the bottom of a conduit 130 parallel to and underlying conduit 99. Conduit 130 extends rearwardly from housing 33 between the fuel tanks 34 and carries power lines from the pumps in the housing. The ends of conduits 99 and 130 are connected together by vertical plates 125 welded at their top and bottom edges to the sides of the conduits. A continuing conduit 131 underlies the conduit 74 on the rear vehicle section and carries the power lines to the hydraulic cylinders operating the hopper and the discharge door thereon. The conduits 99 and 74 are connected between the pivots 126 by a flexible conduit section 132 and the conduits 130 and 131 are similarly connected by a flexible conduit section 132.

Plates 133 connected to pivots 126 between the clevises 126 extend rearwardly therefrom and are welded at their rear edges to the top and bottom, respectively, of a supporting ring 134 surrounding the flexible conduit sections 132. The ends of the conduits 74 and 131 adjacent to the ring 134 are connected together by vertical plates 135 welded at their top and bottom edges to the conduits 74 and 131, respectively.

The supporting ring is preferably made up of two opposed U-shaped sections 136 angularly disposed to each other with the ends of their legs welded together at the center. Vertical plates 137 are welded to the inner surfaces of the ring across the center joints, and vertically spaced horizontal plates 138 extend transversely between the plates 137. A tubular connector 139 extends between and is welded to the plates 135, and another tubular connector 140 axially aligned with and abutting connector 139 extends between and is welded to the horizontal plates 138. A bolt 141 welded in tube 140 extends through the 139 and is secured therein by a nut 142. Thus, the supporting ring is securely mounted on the conduits 74 and 131 of the rear vehicle section to allow relative turning of the front and rear sections about the pivots 126.

The mechanism for steering or turning the front and rear vehicle sections relative to each other preferably includes a pair of hydraulic cylinders 143 pivoted at their ends on bracket ears 144 extending laterally from opposite sides of the top and bottom plates 145 on an H bar extending between and welded to the vertical plates 125. The piston rods 146 extending rearwardly from the cylinders 143 have pivot connectors 147 on their outer ends which are each pivotally connected to a pair of diverging links 148 and 149. The opposite ends of links 148 are pivoted to the rear ends of plates 145 and the opposite ends of links 149 are pivoted to the front edges of plates 138 extending forwardly from the medial portion of the reinforcing ring 134.

Actuation of the pistons 146 in opposite directions will actuate the links 148 and 149 to cause relative turning of the front and rear vehicle sections about the pivots 126. The hydraulic lines (not shown) for actuating the pistons 146 are connected to one of the hydraulic pumps in the housing 33 by a metering valve of well-known construction which progressively feeds hydraulic fluid through the cylinders 143 in reverse directions as desired for relative turning of the front and rear vehicle sections. Referring to FIGS. 3 and 4, the metering valve may be operatively connected to the steering wheel 150 for accomplishing relative turning of the two vehicle sections.

Figure 16:
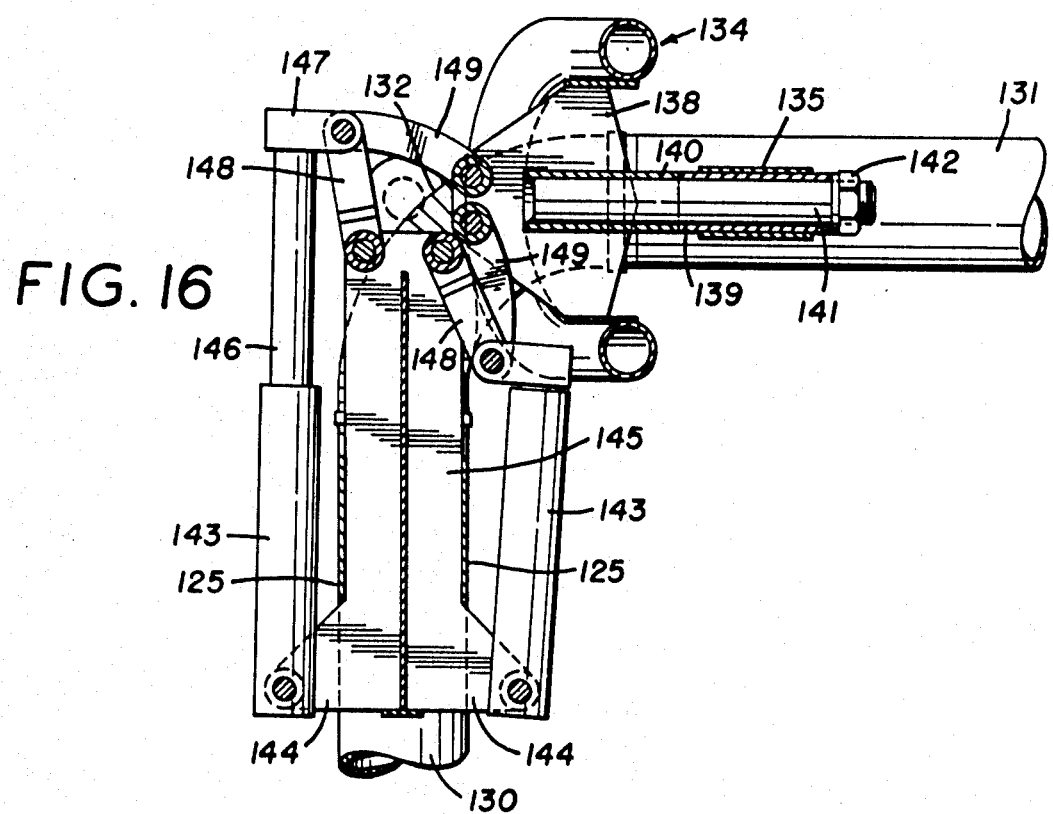
FIG. 16 is a view similar to FIG. 15, showing the steering mechanism in the position when the front and rear vehicle sections are at 90° to each other.

When the pistons 146 are actuated in reverse directions, as the vehicle is being propelled in a forward direction, the two vehicles swing or "jackknife" relative to each other about the pivots 126, causing the rearward section to track behind the forward section, as indicated in FIGS. 15 and 16. As the vehicle sections follow a curved path the differential speed of the inner and outer wheels on the curve is automatically accomplished by cross connecting the hydraulic fluid supply with each pair of wheel torque motors so that the greater amount of fluid will be supplied to the outside wheel motor.

The steering mechanism operated by steering wheel 150 is connected to a pump in housing 33 by hydraulic lines housed in the swinging arm 151 and the stationary arm 152 projecting from the housing on which arm 151 is pivoted. Control levers 153 on the arm 151 control the throttle of the engine and the hydraulic pump supplying fluid to the four torque motors driving the wheels 35 and 37. When the boom is in operation for picking fruit, the arm 151 is swung downwardly out of the way, as shown in FIG. 1 and in phantom in FIG. 3. Thus, the vehicle can only be propelled from one location to another when the boom 90 is folded down over the lower boom 78 in the position of FIGS. 3 and 4, with the steering wheel 150 swung into position in front of a man standing in the bucket or seated on a folding seat 154 hinged to the top of the bucket.

Figure 20:
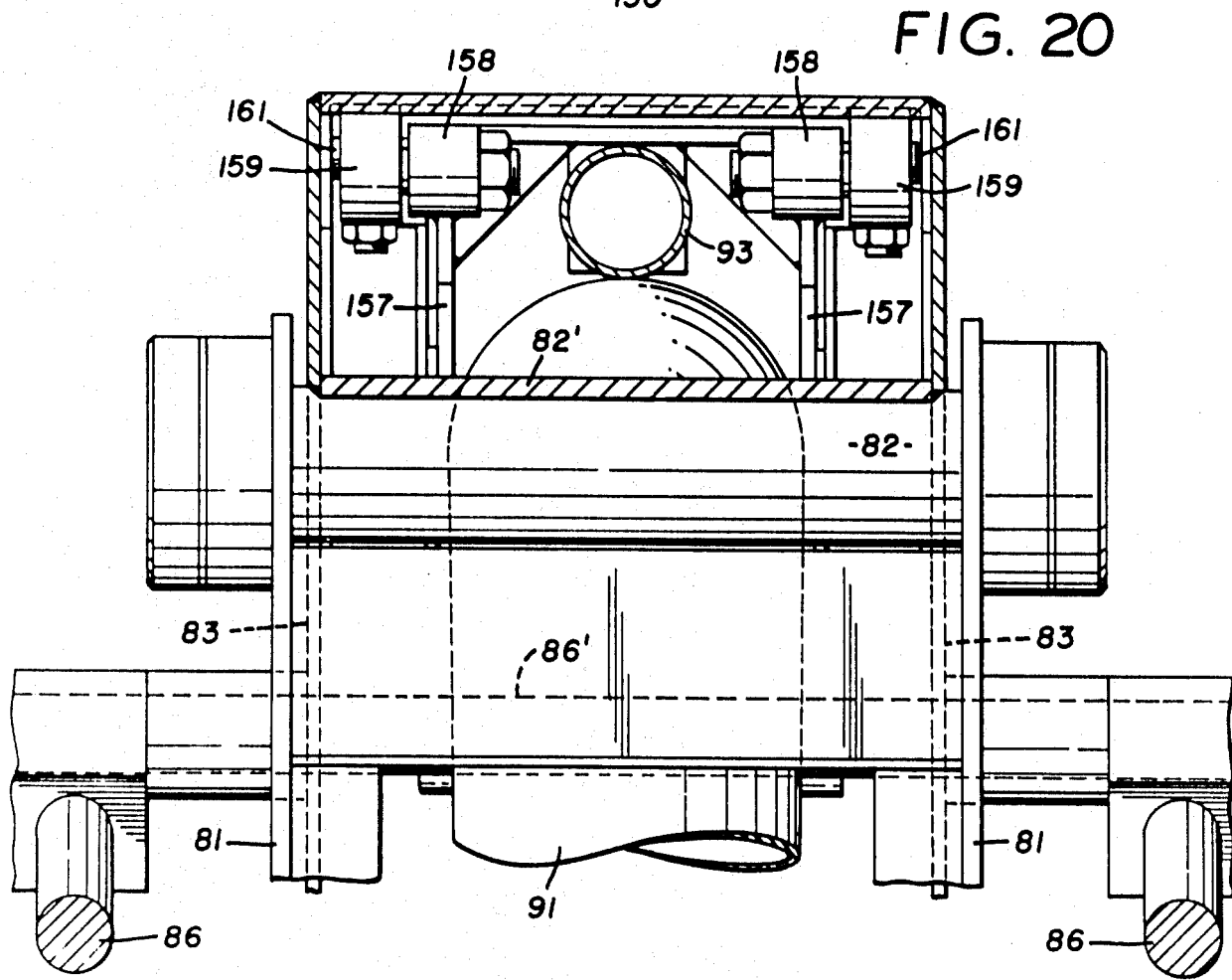
FIG. 20 is an enlarged sectional view on line 20—20 of FIG. 17A.
Figure 17A:
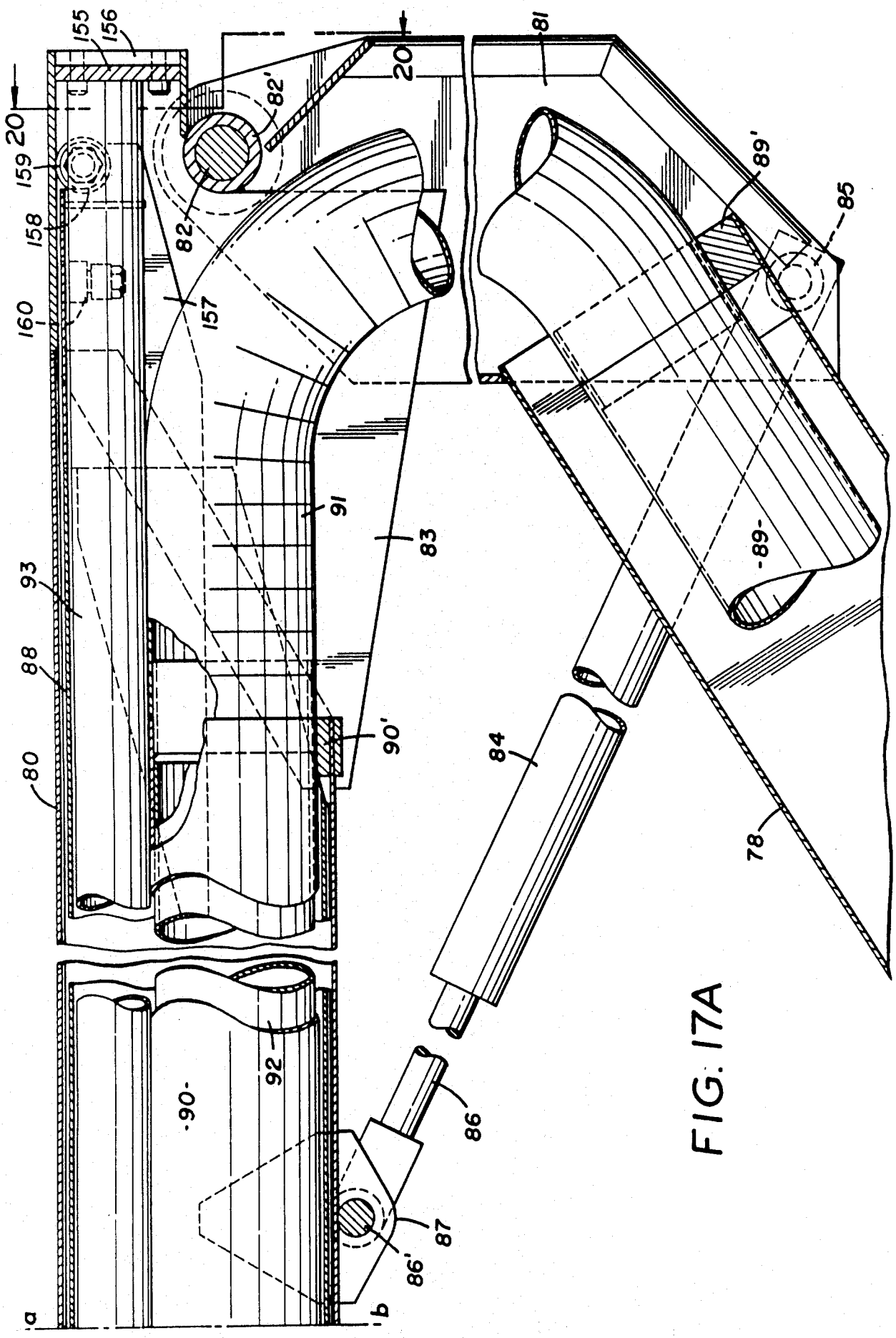
FIGS. 17A and 17B taken together represent an enlarged partial section showing the upper arm of the boom in retracted horizontal position and the connection between the upper and lower boom arms.
Figure 22:
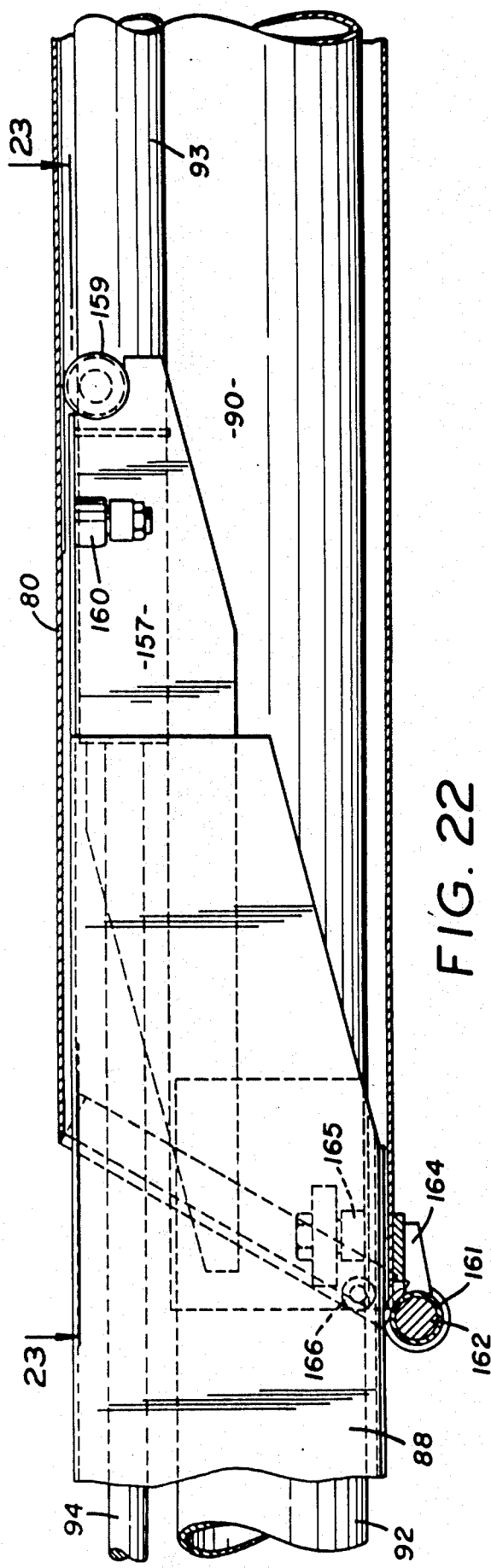
FIG. 22 is a sectional view similar to FIG. 17B, showing the upper boom arm fully extended.
Figure 23:
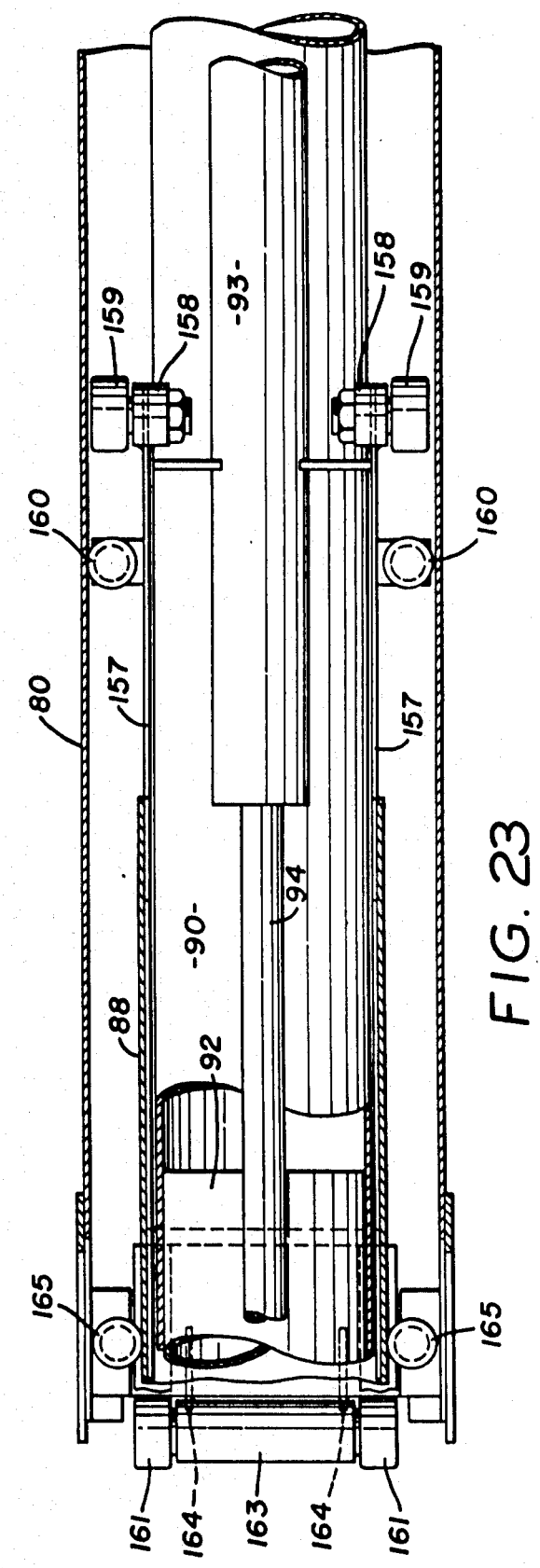
FIG. 23 is a plan sectional view on line 23—23 of FIG. 22.

Referring to FIGS. 17A, 17B and 20 – 23, the construction and operation of the upper extensible boom arm 80 will now be described. As shown in FIGS. 17A and 20, the base plate 155 at the end of hydraulic cylinder 93 is secured to an end plate 156 at the end of the boom arm 80. The lower or rear end of the inner boom arm 88 has side bracket plates 157 extending therefrom, and bearings 158 are secured thereto carrying rollers 159 for rolling on the inner surface of the upper wall of the outer boom arm 80 when the inner arm is extended. The plates 157 also carry side roller 160 for rolling on the inner surfaces of the side walls of the outer boom arm (FIGS. 22 and 23).

Figures 17B, 21:
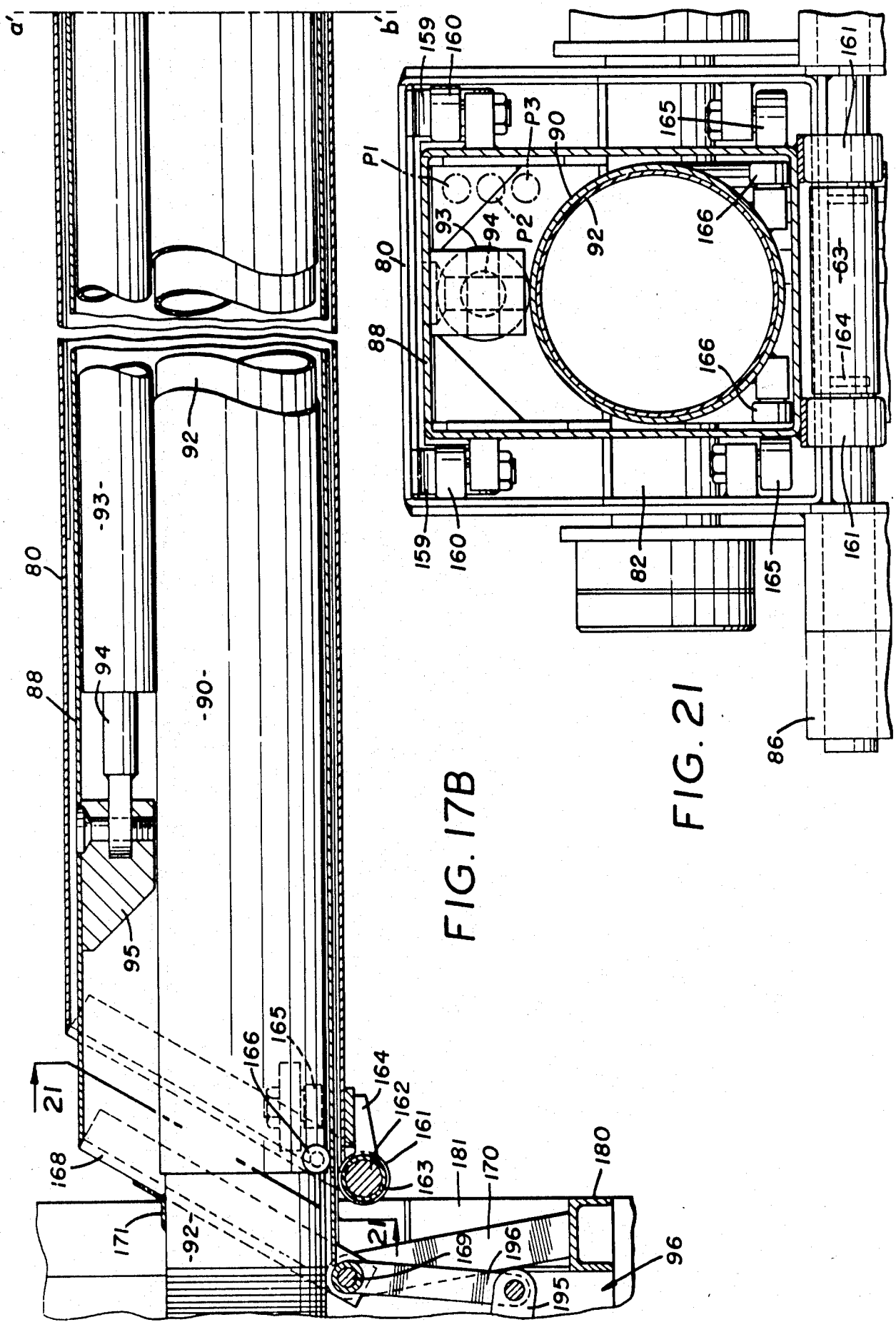
FIG. 21 is an enlarged partial sectional view on line 21—21 of FIG. 17B.

As shown in FIGS. 17B and 21, the front or upper end of the inner boom arm 88 is supported at the bottom by rollers 161 journaled on the pivot shaft 162 on which the bucket 96 is mounted. The shaft 162 is mounted on the bottom of the outer boom arm by a shearing 163 secured to the boom by bearing brackets 164. Within the front end of the outer boom arm rollers 165 are mounted on the lower portions of the side walls for bearing on the lower portions of the side walls of the inner boom 88.

At the front end of outer conduit 90 rollers 166 are mounted on the bottom of the conduit for rollably supporting it on the bottom wall of the inner boom 88 as the inner boom is extended. The front end of inner boom 88 has angular side bars 168 secured to its side walls and journaled at their lower ends to a pivot shaft 169 mounted on the rear side of the bucket 96 by vertical bars 170. An angle bar 171 extends between side bars 168 and is secured to the top of conduit 92 so that the conduit moves with inner boom 88.

Accordingly, when the piston rod 94 of hydraulic cylinder 93 is actuated to extend the inner boom 88 forwardly, as indicated in FIGS. 22 and 23, the inner conduit 92 is extended with the inner boom 88, and the bucket 96 is projected outwardly of the outer boom, as illustrated in FIG. 10A. By thus extending the inner boom, raising and lowering the outer boom arm 80 on the pivot 92, and rotating the lower boom 78 on the bearing 79, the bucket may be manipulated to desired positions all over the inner spherical surfaces of four trees around the vehicle, as indicated in phantom in FIG. 2, to enable a man in the bucket to pick all of the fruit in those areas of the trees.

Figure 26:
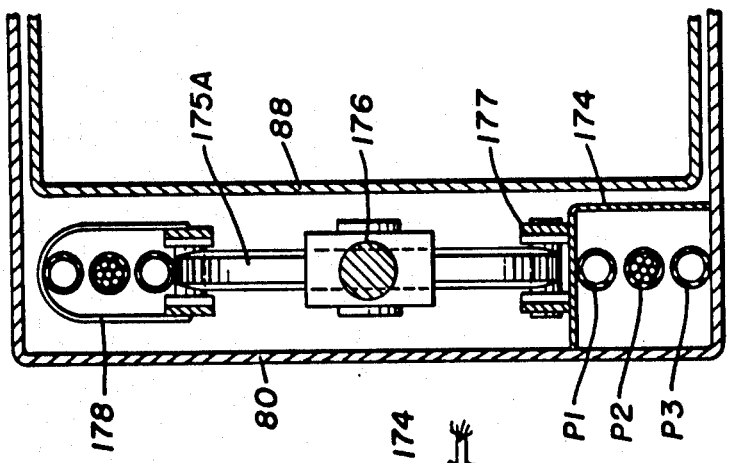
FIG. 26 is a sectional view on line 26—26 of FIG. 24.
Figure 24:
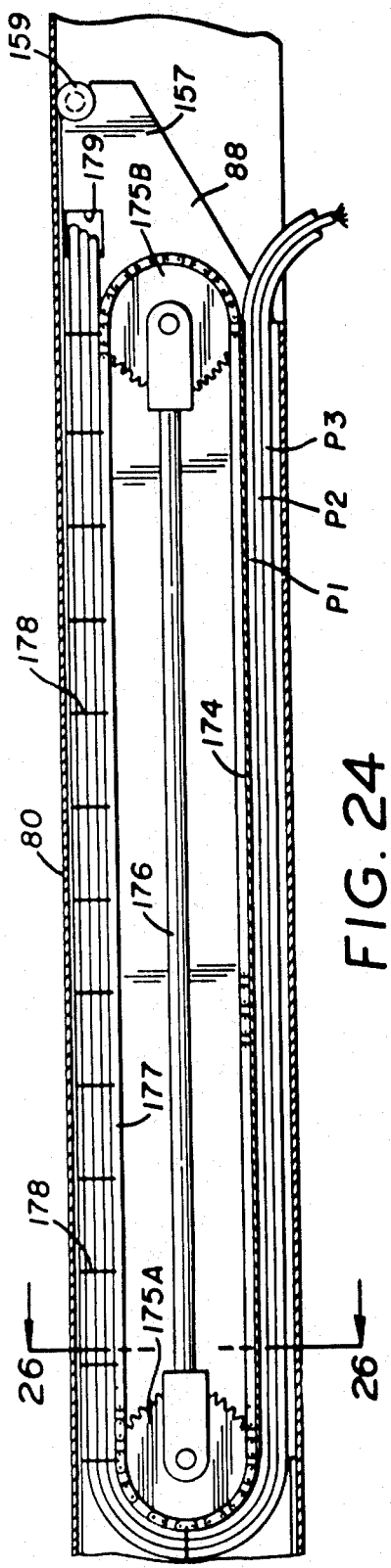
FIG. 24 is a sectional view of the upper boom arm showing the take-up means for the power lines in retracted position.

The power lines leading from the housing 33 to the bucket 96 are taken from the housing through the bearing 79 outside of the elbow 123 and thence through the lower boom 78 and into the lower end of the outer upper boom 80 pivoted thereon. The mechanism for accommodating the power lines within the upper booms and compensating for the extension and retraction of the inner boom is shown in FIGS. 24 – 26.

The power lines are indicated at P1, P2 and P3 coming from the lower boom and extending alongside within a rectangular duct 174 in a lower corner of the outer boom 80 along one side of the inner boom 88. Within the boom 80 above the duct 174 are two sprockets 175A and 175B rotatably mounted on the ends of a rigid longitudinal bar 176, and an endless chain 177 is trained around the sprockets with the lower run of the chain slidably supported on the top of duct 174. In the retracted position of the inner boom 88, the lines P1, P2 and P3 are wrapped around the sprocket 175A and extend rearwardly along the upper run of the chain 177 to which they are attached by a series of spaced wire clamps 178. The rear ends of the lines extend through an opening 179 in the side plate 157 of the inner boom and then extend forwardly through the upper portion of the inner boom to the bucket, as indicated in FIG. 21.

Figure 25:
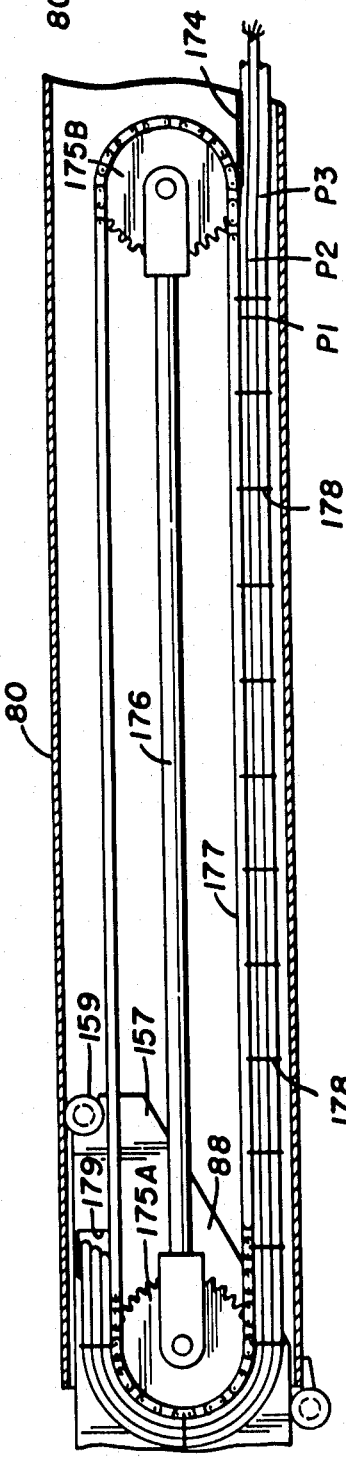
FIG. 25 is a similar view showing the power lines fully extended.
Figure 27:
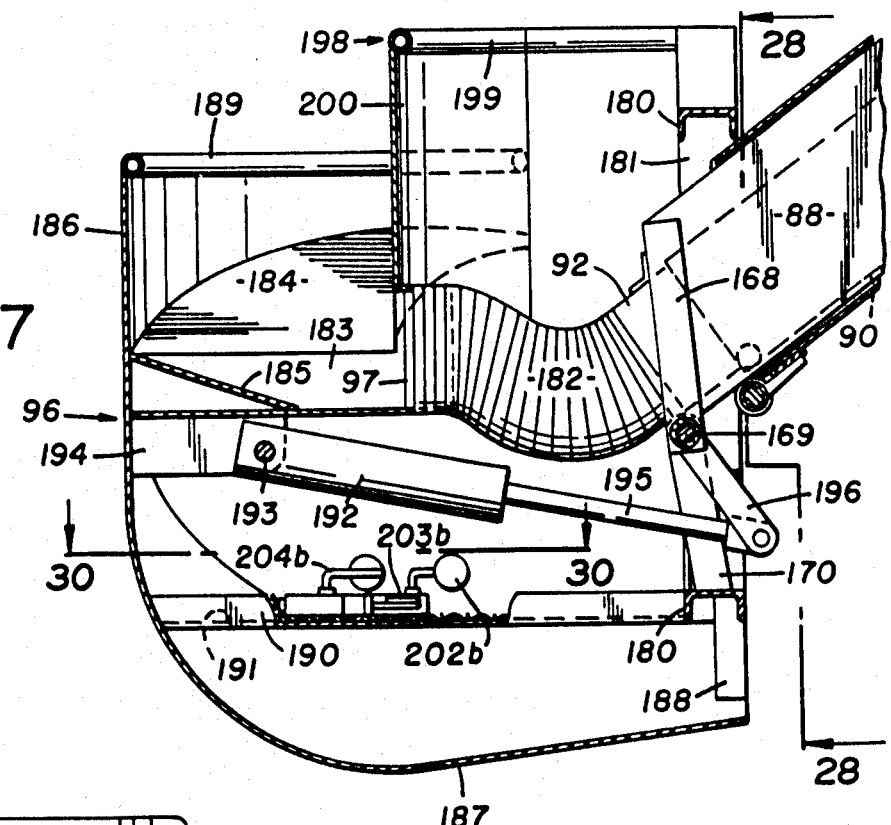
FIG. 27 is a vertical sectional view of the bucket mounted on the outer end of the upper boom arm.
Figure 28:
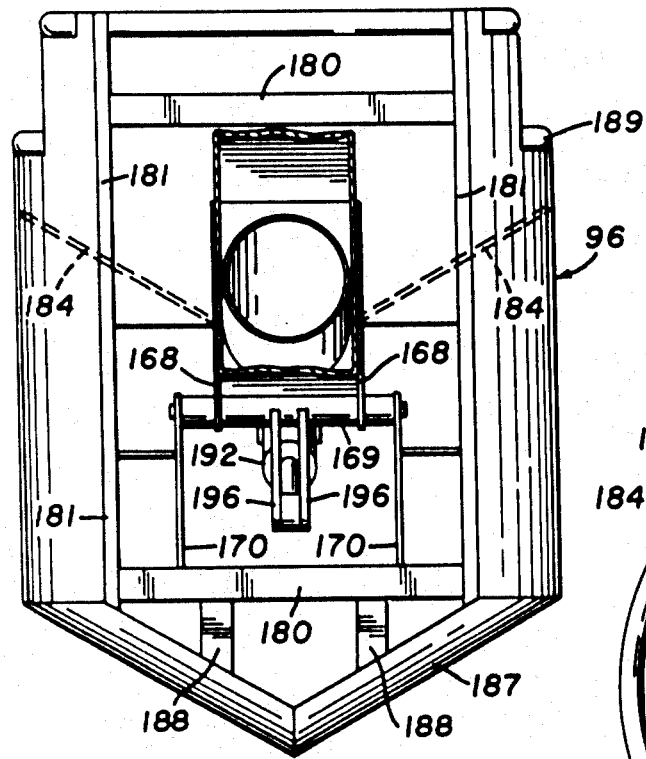
FIG. 28 is a vertical sectional view on line 28—28 of FIG. 27.
Figure 29:
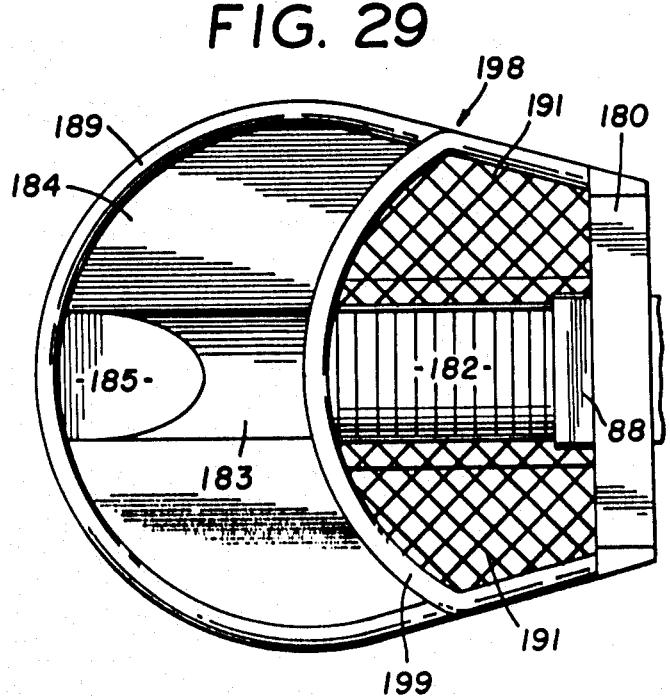
FIG. 29 is a plan view of the bucket.

Accordingly, when the inner boom arm 88 is extended lines P1, P2 and P3 are carried forward by the forward movement of the opening 179 through which they pass, moving the chain 177 and sprockets 175A and 175B forwardly and moving the chain around the sprockets so that its upper run becomes the lower run as indicated in FIG. 25. Thus, the chain and sprockets provide a closed loop to guide the lines into a storage loop in the retracted position of the inner boom to accommodate its extended position.

Referring to FIGS. 27 – 30, the bucket 96 has at its rear side a rectangular frame defined by horizontal channels 180 and vertical side bars 181 through which the front end of the inner boom arm 88 and the attached front end of the inner conduit 92 project. A piece of flexible conduit 182 connects the end of conduit 92 to the rear lower end of a trough formed in the front of the bucket by a curved bottom wall 183, inclined side walls 184 and inclined front wall 185, which walls slope downwardly from the curved outer wall 186 of the bucket. The outer wall of the bucket merges into a V-shaped bottom wall 187 which terminates at the V-shaped frame 188 at the bottom rear portion of the bucket. The upper edge of the curved wall 186 terminates at a tubular rail 189. The curved outer wall and the V-shaped bottom wall of the bucket are designed and adapted to move through the branches of trees with a minimal amount of damage to the branches.

A pair of laterally spaced angles 190 extend from the lower rear channel 180 to the front wall 186 of the bucket for supporting two sections 191 of mesh flooring below and on opposite sides of the flexible conduit 182. In the space between the flooring sections and immediately below the flexible conduit 182 is a hydraulic leveling cylinder 192 for keeping the bucket substantially level regardless of the inclination of the boom 88 on which it is mounted. The front end of cylinder 192 is pivoted at 193 to a bracket plate 194 extending downwardly from the trough bottom 183, and the rear end of the piston rod 195 of cylinder 192 is pivoted to links 196 secured at their opposite ends to the pivot shaft 169. Suitable leveling mechanism (not shown) may comprise a mercury leveling switch of well-known construction mounted on the bucket and adapted to operate the cylinder 192 in one direction or the other to maintain the bucket level at all times.

Within the rear portion of the bucket 96 is a curved smaller bucket 98 extending somewhat above the outer bucket and terminating at the rear frame thereof. The inner bucket has a rounded tubular rail 199 around its top edge and its front wall 200 is also convexly curved for easy movement through tree branches. The height of the rail 199 above the flooring sections is such that when a man is standing on the flooring 191 with his legs straddling the flexible conduit 182, the rail 199 will be located just below his waist so that he can safely lean out of the bucket to reach fruit for picking, as indicated in FIG. 1.

Located on the flooring sections are the foot actuated controls for manipulating the boom. These controls manipulate the bucket all over the tree by raising and lowering the upper outer boom about the pivot 82 on the lower boom, by swinging the lower boom on its bearing 75, and by extending and retracting the upper inner boom.

These controls may be switches operated by pedals 202a and 202b, 203a and 203b, and 204a and 204b for actuating solenoid valves controlling the respective hydraulic motors. Thus, pedals 202a and 202b may be operated by lateral movement of the picker's feet to actuate cylinder 121 and rotate the lower boom in opposite directions on its bearing in the housing 33. Pedals 203a and 203b may be operated by downward pressure of the picker's feet to actuate cylinder 84 and raise and lower the upper boom 80. Pedals 204a and 204b may be operated by lateral pressure of the picker's feet to actuate cylinder 93 and extend and retract the upper inner boom 88.

By controlling all movements of the bucket with his feet, the picker has both hands free to reach out in all directions and pick fruit while manipulating the bucket in all directions over trees surrounding the location of the front vehicle section 30, and in all positions the tilting effect on the base vehicle caused by the overhang of the bucket is at least partially counterbalanced by the fact that the upper boom 80 is reversely inclined to the lower boom 78.

Figure 2:
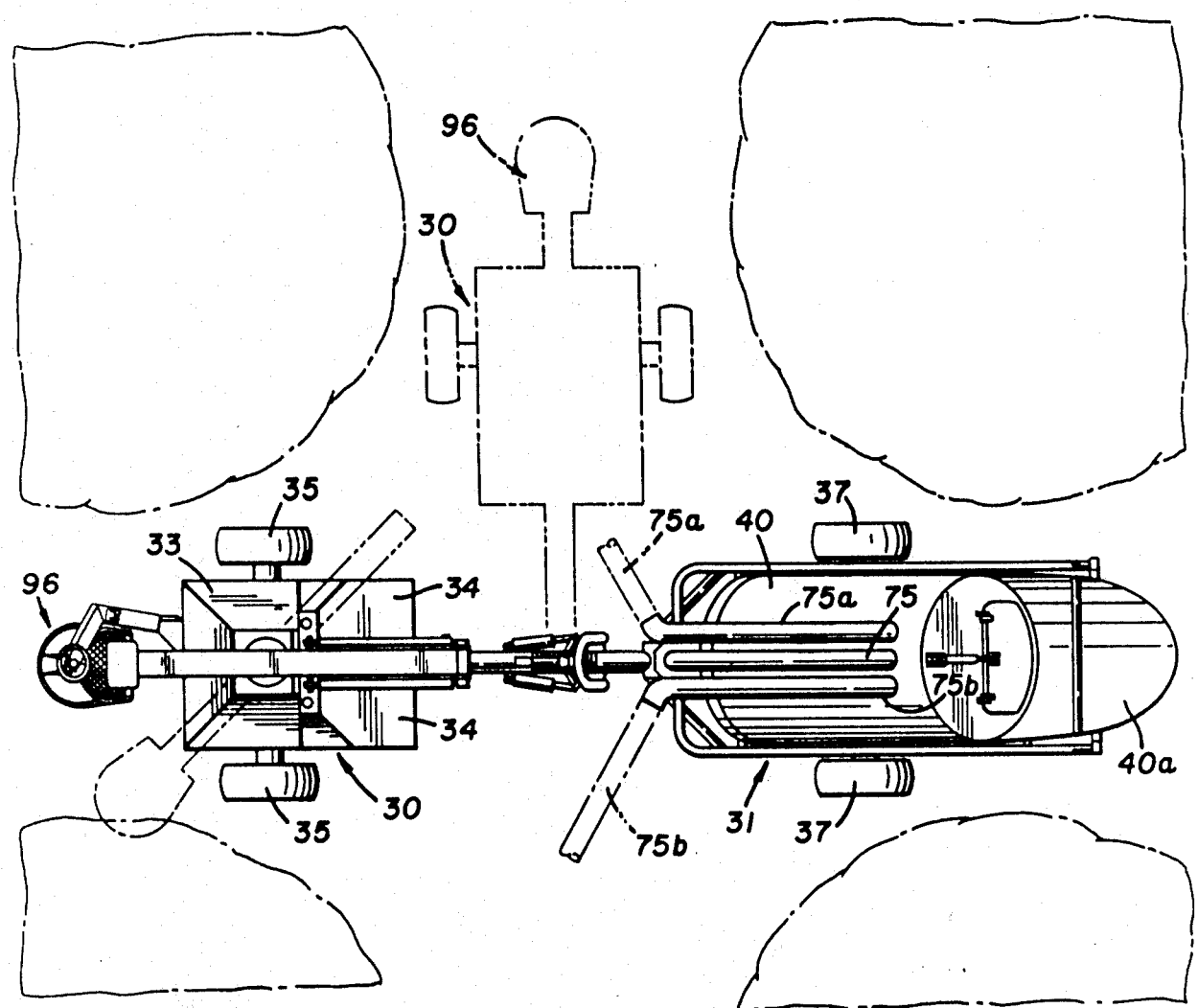
FIG. 2 is a plan elevation of the machine with the boom in lowered and retracted position and the front section in phantom pivoted at 90° to the rear section.

The sub-atmospheric pressure maintained in the hopper 40 by the blower 66 creates a continuous flow of air from the mouth of flexible conduit 182 through conduits 92, 90, 91, 89, 99, 74 and 75 to the hopper so that fruit deposited in the trough 183 in the bucket is rapidly conducted into the hopper. Because of the air flow the bucket may be lowered so that the picker may reach fruit growing on low hanging branches as the fruit will travel upwardly in the conduits 92 and 90 and thence downwardly through conduit 89. However, it may be desirable to have one or two additional pickers standing on the ground and picking the fruit from the low hanging branches while the picker in the bucket harvests the rest of the fruit. For this purpose, as shown in FIG. 1, 2 and 4A, additional fruit conduits 75a and 75b are connected into hopper 40 alongside of conduit 75. The conduits are connected to flexible conduits 75a' and 75b' which lay on the ground and are connected at their outer ends to sacks or other picking receptacles carried by the pickers on the ground.

It will be apparent that an improved fruit harvesting apparatus has been provided which has front and rear vehicle sections steerably connected to each other and respectively carrying a rotatable extensible boom and a tiltable hopper, with a picker-supporting bucket on the outer end of the boom, the fruit being transported from the bucket through the boom to the hopper by air flow in all positions of the bucket. All movements of the bucket are controlled by the feet of the picker while using his hands to pick fruit from various positions all over trees surrounding the vehicle, but the vehicle can not be propelled from one location to another until the bucket is lowered to a non-picking position over the front vehicle section where the propelling and steering controls are accessible by swinging the arm 151 into steering position.

I claim:

1. Apparatus for picking fruit from trees, including a supporting vehicle, an articulated hollow extensible boom having a lower arm rotatably mounted on said vehicle and an upper extensible arm pivoted on said lower arm and adapted to receive fruit into its outer end, said upper extensible arm comprising an outer boom arm and an inner boom arm telescopically slidable therein, an outer conduit within and secured to the outer boom arm and an inner conduit telescopically slidable in said outer conduit and secured to said inner boom arm, a hopper mounted on said vehicle communicating with the lower end of said lower arm, means for maintaining sub-atmospheric pressure in said hopper to create an air flow through the boom for conducting fruit through said boom to said hopper, a man-supporting bucket carried on the outer end of the upper arm of said boom, means for rotating said lower arm on said vehicle, means for raising and lowering said upper arm, and means for extending and retracting said upper arm.

2. Apparatus for picking fruit from trees as in claim 1, further including controls for the boom which are mounted within the bucket and operable by foot movements of a man therein.

3. Apparatus for picking fruit from trees as in claim 1, in which power means mounted in the outer boom arm is connected to the inner boom arm for extending and retracting the inner boom arm and the inner conduit.

4. Apparatus for picking fruit from trees as in claim 3, in which the bucket is pivotally mounted on the outer end of the inner boom arm.

5. Apparatus for picking fruit from trees as in claim 4, in which power means is mounted on the bucket for automatically maintaining it level at all positions of the boom.

6. Apparatus for picking fruit from trees as in claim 1, in which the bucket is pivotally mounted on the outer end of the inner boom arm.

7. Apparatus for picking fruit from trees as in claim 6, in which power means is mounted on the bucket for automatically maintaining it level at all positions of the boom.

8. Apparatus for picking fruit from trees as in claim 1, in which the hopper is mounted on the vehicle for bodily dumping its contents, and power means are provided for bodily dumping said hopper.

9. Apparatus for picking fruit from trees as in claim 8, in which power means are provided for bodily dumping said hopper, and the conduit means connecting the lower end of said boom to said hopper has a normally sealed separable butt joint to permit bodily dumping said hopper.

10. Apparatus for picking fruit from trees, including a supporting vehicle, an articulated hollow extensible boom rotatably mounted on said vehicle and adapted to receive fruit into its outer end, said boom having a lower arm rotatably mounted on said vehicle and an upper extensible arm pivotally connected to said lower arm, said upper extensible arm comprising an outer boom arm and an inner boom arm telescopically slidable therein, flexible power lines passing through the outer and inner boom arms, and closed loop means movably mounted in the outer boom arm for guiding the power lines into a storage loop which accommodates extension of the inner boom arm, a hopper mounted on said vehicle, conduit means connecting the lower end of said boom to said hopper, means for maintaining sub-atmospheric pressure in said hopper to create an air flow through the boom and said conduit means for conducting fruit through said boom to said hopper, a man-supporting bucket carried on the outer end of said boom, means for rotating said boom on said vehicle, means for raising and lowering said boom, and means for extending and retracting said boom.

11. Apparatus for picking fruit from trees as in claim 10, in which chute means supported on said bucket conducts the picked fruit to the outer end of said boom.

12. Apparatus for picking fruit from trees as in claim 11, in which the chute means comprises an inclined trough on said bucket.

13. Apparatus for picking fruit from trees as in claim 12, in which flexible conduit means connects the trough to the outer end of the boom.

14. Apparatus for picking fruit from trees as in claim 10, in which power means mounted in the outer boom arm is connected to the inner boom arm for extending and retracting the inner boom arm.

15. Apparatus for picking fruit from trees as in claim 10, in which the supporting vehicle has front and rear sections connected by a central pivot, the boom being rotatably mounted on the front section and the hopper being movably mounted on the rear section for bodily dumping its contents, the conduit means connecting the inner end of said boom to said hopper includes a flexible conduit traversing the central pivot, and power means are provided for laterally swinging one vehicle section relative to said other section.

16. Apparatus for picking fruit from trees as in claim 15, in which power means are provided for bodily dumping said hopper.

* * * * *